United States Patent
Pirjanian et al.

(10) Patent No.: US 12,136,431 B2
(45) Date of Patent: Nov. 5, 2024

(54) MULTIMODAL BEAMFORMING AND ATTENTION FILTERING FOR MULTIPARTY INTERACTIONS

(71) Applicant: Embodied, Inc., Pasadena, CA (US)

(72) Inventors: Paolo Pirjanian, Glendale, CA (US); Stefan Scherer, Santa Monica, CA (US); Mario E Munich, La Canada, CA (US)

(73) Assignee: Embodied, Inc., Pasadena, CA (US)

( * ) Notice: Subject to any disclaimer, the term of this patent is extended or adjusted under 35 U.S.C. 154(b) by 370 days.

(21) Appl. No.: 17/622,703

(22) PCT Filed: Feb. 28, 2021

(86) PCT No.: PCT/US2021/020148
§ 371 (c)(1),
(2) Date: Dec. 23, 2021

(87) PCT Pub. No.: WO2021/174162
PCT Pub. Date: Sep. 2, 2021

(65) Prior Publication Data
US 2022/0180887 A1     Jun. 9, 2022

Related U.S. Application Data

(60) Provisional application No. 63/154,727, filed on Feb. 27, 2021, provisional application No. 62/983,595, filed on Feb. 29, 2020.

(51) Int. Cl.
*G10L 21/0208* (2013.01)
*G06V 40/16* (2022.01)
(Continued)

(52) U.S. Cl.
CPC ........ *G10L 21/0208* (2013.01); *G06V 40/172* (2022.01); *G06V 40/176* (2022.01);
(Continued)

(58) Field of Classification Search
CPC ..... G10L 21/0208; G10L 15/25; G10L 17/06; G10L 2021/02087; G10L 2021/02166;
(Continued)

(56) References Cited

U.S. PATENT DOCUMENTS

| | | |
|---|---|---|
| 11,148,296 B2 | 10/2021 | Breazeal |
| 2002/0165642 A1 | 7/2002 | Sakaue et al. |

(Continued)

FOREIGN PATENT DOCUMENTS

| | | |
|---|---|---|
| CN | 111563140 | 8/2020 |
| WO | WO/2019/144542 | 8/2019 |
| WO | WO/2019/161198 | 8/2019 |

OTHER PUBLICATIONS

International Search Report and Written Opinion of the International Searching Authority, Mailed Jun. 30, 2021, PCT/US21/20035, 12 pages.

(Continued)

*Primary Examiner* — Thierry L Pham
(74) *Attorney, Agent, or Firm* — Mark R. Kendir

(57) ABSTRACT

Systems and methods for creating a view of an environment are disclosed. Exemplary implementations may: receive parameters and measurements from at least two of one or more microphones, one or more imaging devices, a radar sensor, a lidar sensor, and/or one or more infrared imaging devices located in a computing device; analyze the parameters and measurements received from the multimodal input; generate a world map of the environment around the computing device; and repeat the receiving of parameters and measurements from the input devices and the analyzing steps on a periodic basis to maintain a persistent world map of the environment.

19 Claims, 11 Drawing Sheets

(51) Int. Cl.
  *G06V 40/20* (2022.01)
  *G10L 15/25* (2013.01)
  *G10L 17/06* (2013.01)
  *G10L 21/0216* (2013.01)
(52) U.S. Cl.
  CPC .............. *G06V 40/20* (2022.01); *G10L 15/25* (2013.01); *G10L 17/06* (2013.01); *G10L 2021/02087* (2013.01); *G10L 2021/02166* (2013.01)
(58) Field of Classification Search
  CPC .... G06V 40/172; G06V 40/176; G06V 40/20; G06V 40/174; G06V 40/18; G06Q 30/015; G06Q 50/01; G06Q 10/10
  USPC .......................................................... 704/226
  See application file for complete search history.

(56) References Cited

U.S. PATENT DOCUMENTS

| | | |
|---|---|---|
| 2007/0128979 A1 | 6/2007 | Shackelford et al. |
| 2009/0055019 A1 | 2/2009 | Stiehl et al. |
| 2010/0076750 A1 | 3/2010 | Cosatto et al. |
| 2015/0148953 A1 | 5/2015 | Laurent et al. |
| 2015/0339589 A1 | 11/2015 | Fisher |
| 2016/0151971 A1 | 6/2016 | Faridi et al. |
| 2016/0199977 A1 | 7/2016 | Breazeal |
| 2017/0125008 A1 | 5/2017 | Maisonnier et al. |
| 2017/0358305 A1 | 12/2017 | Kudurshian et al. |
| 2018/0068226 A1 | 3/2018 | O'Connor et al. |
| 2018/0133900 A1 | 5/2018 | Breazeal et al. |
| 2018/0229372 A1 | 8/2018 | Breazeal et al. |
| 2018/0260680 A1 | 9/2018 | Finkelstein et al. |
| 2018/0277117 A1 | 9/2018 | Hergenroeder |
| 2018/0301151 A1* | 10/2018 | Mont-Reynaud ....... G10L 15/22 |
| 2019/0042988 A1 | 2/2019 | Brown et al. |
| 2019/0248019 A1 | 8/2019 | Nelson |
| 2019/0279639 A1 | 9/2019 | Ginsberg et al. |
| 2019/0366538 A1 | 12/2019 | Laurent et al. |
| 2020/0050173 A1 | 2/2020 | Scherer et al. |
| 2020/0218781 A1 | 7/2020 | Takano et al. |

OTHER PUBLICATIONS

International Search Report and Written Opinion of the International Searching Authority, Mailed May 20, 2021, PCT/US21/20124, 11 pages (2nd).

International Search Report and Written Opinion of the International Searching Authority, Mailed May 18, 2021, PCT/US21/20056, 21 pages (3rd).

International Search Report and Written Opinion of the International Searching Authority, Mailed Jun. 9, 2021, PCT/US21/20128, 10 pages.

International Search Report and Written Opinion of the International Searching Authority, Mailed Aug. 9, 2021, PCT/US21/29297, 15 pages.

International Search Report and Written Opinion of the International Searching Authority, Mailed May 2, 2022, PCT/US22/14213, 21 pages.

International Search Report and Written Opinion of the International Searching Authority, Mailed May 18, 2021, PCT/US21/20148, 12 pages.

European Extended Search Report, Mar. 20, 2024, Application No. 21759786.3 / PCT/US2021020148, 10 pages.

* cited by examiner

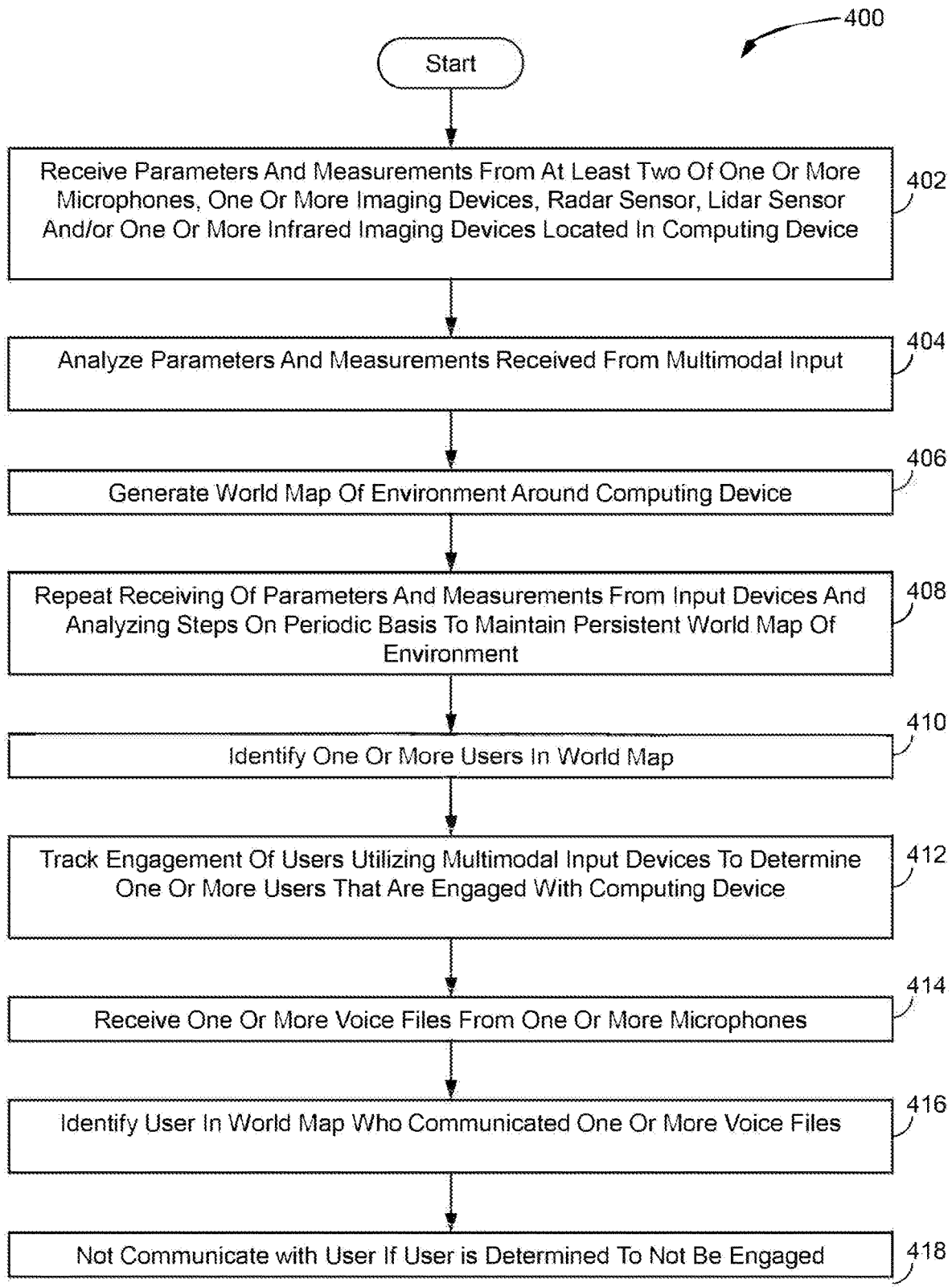

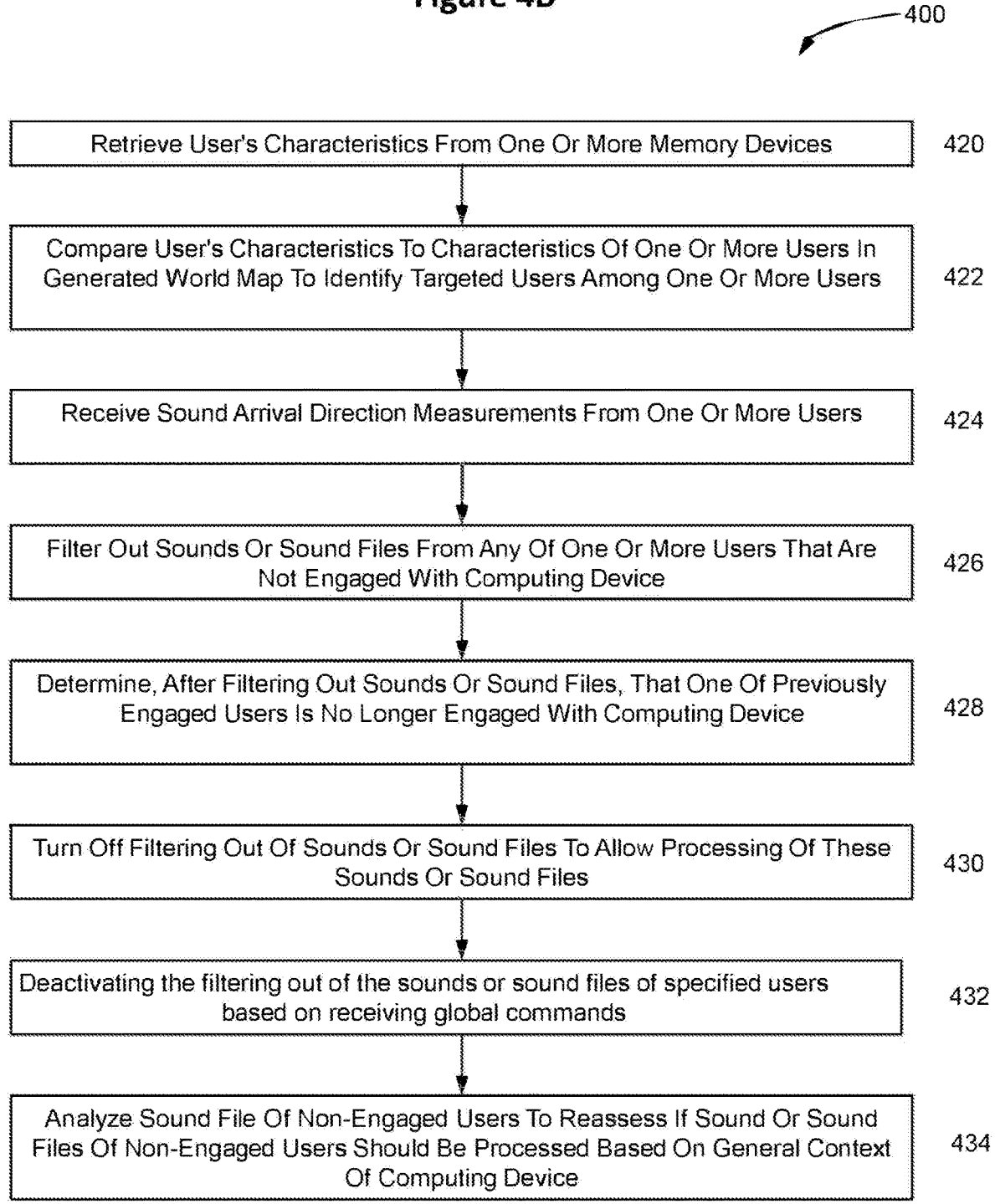

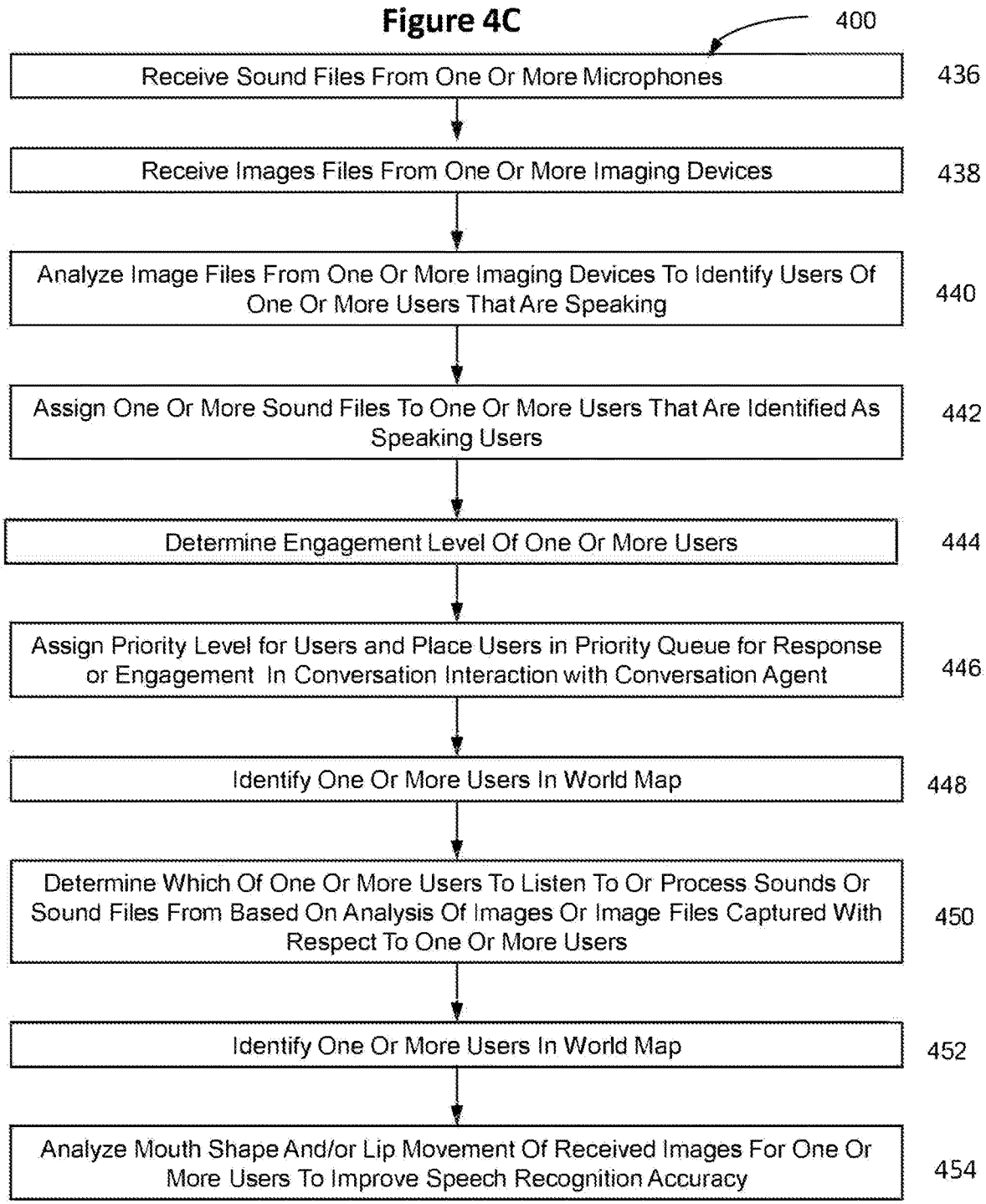

even though the drawings are for the

MULTIMODAL BEAMFORMING AND ATTENTION FILTERING FOR MULTIPARTY INTERACTIONS

RELATED APPLICATIONS

This application is a national stage filing and claims priority to PCT Application No. PCT/US21/20148, filed Feb. 28, 2021 and entitled "MULTIMODAL BEAMFORMING AND ATTENTION FILTERING FOR MULTIPARTY INTERACTIONS," which claims priority to U.S. provisional patent application Ser. No. 62/983,595, filed Feb. 29, 2020, entitled "MULTIMODAL BEAMFORMING AND ATTENTION FILTERING FOR MULTIPARTY INTERACTIONS" and to U.S. provisional patent application Ser. No. 63/154,727, filed Feb. 27, 2021, entitled "MULTIMODAL BEAMFORMING AND ATTENTION FILTERING FOR MULTIPARTY INTERACTIONS," the disclosure of which are hereby incorporated by reference in their entirety.

FIELD OF THE DISCLOSURE

The present disclosure relates to systems and methods for utilizing meta-information and other information to determine priority of users in conversation interactions with a robot computing device and also for using noise reduction techniques.

BACKGROUND

Ecologically valid environments for conversational agents or systems can be noisy, full of people, and complex to navigate. Current systems are not able to filter out unnecessary input from other sources. In addition, with current conversational agents or systems, if a user speaks a wake word or otherwise accidentally addresses a conversational agent (e.g., like Alexa), the conversation agent is not able to ignore the input and will react to it falsely or respond to it. Further, all users are the same in current conversational agents and no meta-information is utilized to leverage a main targeted user.

Another limitation of current conversation agents is that current agents only have a single mode that receives input from every user and also gives every user the same priority and attention. A further limitation of current conversation agents is while current conversational agents leverage direction of arrival of sound to improve audio input in noisy environments they have no means to actively further optimize the input and reduce noise. Accordingly, an improved system for addressing these issues and limitations of conversation agents and/or systems is necessary.

SUMMARY

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

BRIEF DESCRIPTION OF THE DRAWINGS

FIG. 4A illustrates a method of determining communication engagement in accordance with one or more implementations;

FIG. 4B illustrates a method of filtering sounds during communication interactions between a robot computing device and user(s), in accordance with one or more implementations;

FIG. 4C illustrates a method of assigning engagement levels in conversation interactions, according to some implementations;

DETAILED DESCRIPTION

Figure 1A:
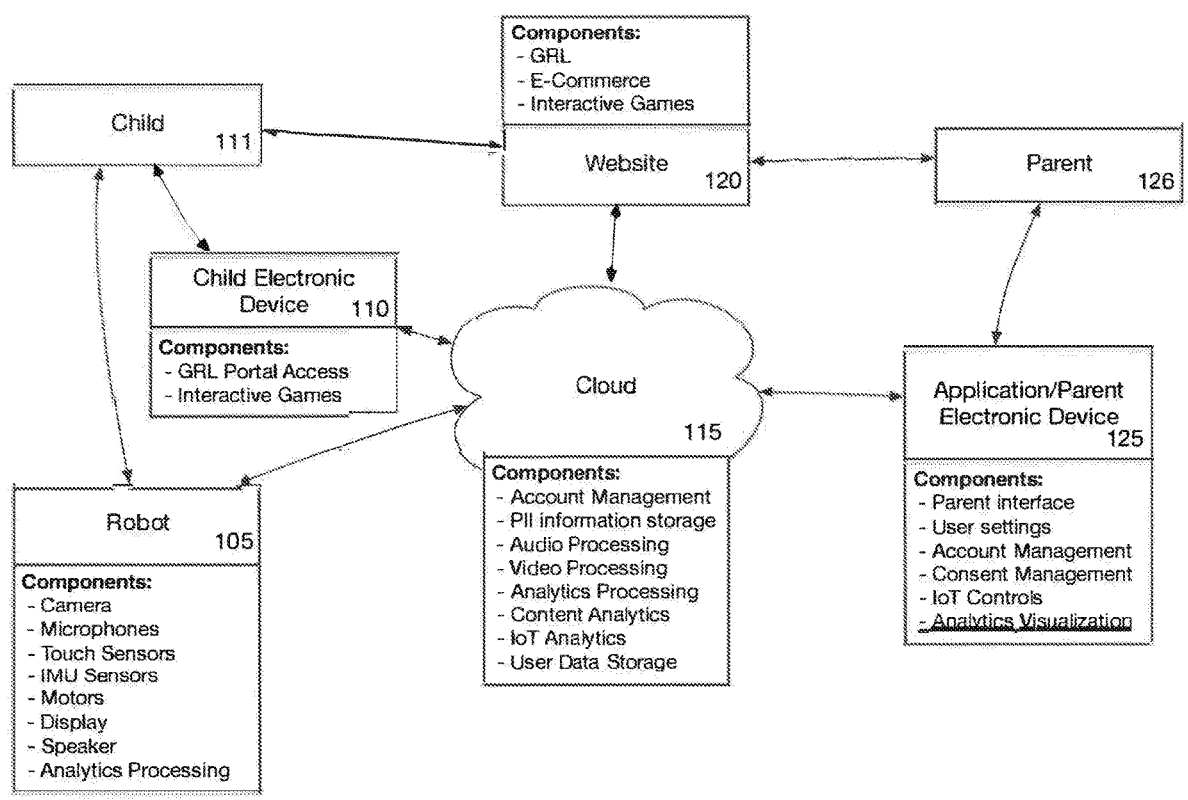
FIG. 1A illustrates a system for a social robot or digital companion to engage a child and/or a parent, in accordance with one or more implementations.

The following detailed description and provides a better understanding of the features and advantages of the inventions described in the present disclosure in accordance with the embodiments disclosed herein. Although the detailed description includes many specific embodiments, these are provided by way of example only and should not be construed as limiting the scope of the inventions disclosed herein.

In some implementations, the multimodal beamforming system and/or attention filtering system is part of and/or included in a conversation agent, conversation engine or conversation system. In some implementations, the conversation agent, the conversation engine or conversation system may be located in or resident within a computing device. In some implementations, the computing device may be a robot computing device, a digital companion, a computing device including voice recognition software and/or sound recognition software, and/or a computing device including facial detection and recognition software and/or facial expression software. In the specification and claims, the terms conversation agent, conversation engine and/or conversation system may be used interchangeably. In the specification and claims, the terms robot computing device, digital companion and/or robot may be utilized interchangeably.

Current conversation agents only have a single mode that receives input from every user with the same priority and attention. In some implementations, the conversation agent and/or system described and claimed herein provides many advantages over current systems. As discussed above, current conversational agents or systems leverage direction of arrival of sound to improve audio input in noisy environments, however, the conversation agent and/or system described and claimed herein utilizes direction of arrival of sound to filter out irrelevant or useless speech and focus on a single, intentionally targeted user at a time. In addition, the conversation agent described herein is able to track and understand the environment in which the computing device including the conversation agent is located and may utilize one or multiple sensors to assist with this task and maintain a model of the world (e.g., a world map) around the conversation agent. By having a world map and knowing what users are engaged, this would allow the conversation agent or system to ignore input that suddenly comes from a different direction than the engaged user was located in.

While some current conversational agents have cameras (e.g., Facebook Portal, Echo Show), these conversation agents are not able to assess who is speaking if two users appear in the frame and speech cannot be clearly attributed to the exact speaker. The conversation agent described and claimed herein can assess who is speaking and what speech is clearly attributed to the exact speaker. In addition, voice prints or other characteristics of the user may be leveraged to track a speaker's activity pattern and identity over time. Another advantage of the conversation agent or system described herein is that the conversation agent is able to discriminate between higher priority inputs and/or also able to change its mode during varying interaction types (single- vs. multiplayer).

In some implementations, the conversation agent or system leverages video input to improve automatic speech recognition (ASR) results in noisy environments. In some implementations, the conversation agent or system may utilize facial expression analysis to recognize if the mouth is moving (as it would during speech) and may also utilize lip-reading to understand what a user might be saying. In some implementations, current conversation agents or systems fail if the noise level is too high, does not recognize the issue of working in an environment with too much noise and may even ignore this issue.

The conversation agent and/or system described and claimed herein includes an algorithm and system for multimodal signal beamforming and filtering for dyadic and multiparty interactions with users. In some implementations, the conversation agent and/or system described and claimed herein enables interactive machines to naturally and efficiently communicate in a broad range of social situations.

In some implementations, the conversation agent or system may be installed in or resident with a robot computing device, a digital companion, a computing device including speech recognition software, a computing device including facial and gesture recognition software, and/or a computing device that interacts with human users through voice and/or imaging. In some implementations, the conversation agent and/or system may leverage multimodal input to track the environment in which the conversation agent or system is located and to maintain a persistent view of the environment or world around the conversation agent. In some implementations, the multimodal input device may include a microphone array or one or more microphones, a camera or one or more imaging devices, a radar sensor or one or more radar sensors, a lidar sensor or one or more lidar sensors, and an infrared camera or one or more infrared or thermal imaging devices, to capture images of the environment, to track users and/or objects in the environment and to maintain a persistent view of the world around the conversation agent. In some implementations, the computing device including the conversation agent or system may have mobility (e.g., move through space to another physical location) and this mobility may allow the computing device to position itself in a better place to track and/or identify users and/or objects in the environment. In some implementations, this mobility allows the computing device including the conversation agent or system to enhance the world map or model. In some implementations, the conversation agent or system may do this on a periodic or continuous basis. In some implementations, the one or more microphones may capture sound files or voice files from all around the conversation agent (e.g., 360-degree coverage). In some implementations, the one or more imaging devices and/or sensors may capture video or image files or monitor the area all around the conversation agent (e.g., 360-degree coverage).

In some implementations, the conversation agent or system may track the engagement of users by utilizing the input devices described above as well as utilizing the methods and systems described in related application entitled "Systems And Methods To Manage Communication Interactions Between A User And A Robot Computing Device or Conversation Agent," the disclosure of which is hereby incorporated by reference.

In some implementations, the conversation agent or system may be able to discern or determine that although a user appears to be talking to the conversation agent or system, the user may not be engaged with the conversation agent or system. In some implementations, the conversation agent or system may then not process the speech of the non-engaged user (e.g., ignore the speech of the non-engaged user). In some implementations, for example, a user could appear to be talking to the conversation (e.g., saying the name "Alexa in a casual conversation") the conversation agent may be able to ignore the speech if the user is determined to not be engaged with the conversation agent.

In some implementations, when a conversation agent or system is in an environment with multiple users (e.g., a multiuser conversation interaction), the conversation agent or system may leverage and/or utilize meta-information such as a user's identity, history, priority status (e.g., is the user the main user?) to focus and target users among possibly many users in the multiuser conversation interaction.

In some implementations, the conversation agent or system may utilize the one or more microphone and/or the one or more sensors to receive one or more sound files and/or other parameters or measurements indicating direction of arrival of the sound files. In some implementations, a direction of arrival module may determine a direction or directions of arrival measurements for the one or more sound files. In some implementations, the conversation agent or system may leverage direction of arrival measurements of the sound or sound files to filter input (e.g., allow input) only from actually engaged users. In some implementations, the conversation agent or system may filter out speech (e.g., not accept or process speech) from other sources that are not determined to be engaged with the conversation agent (e.g., passers-by, cocktail party effect (e.g., large background noise), TV in background, etc.).

In some implementations, the one or more imaging devices or cameras may capture video and/or image files and communicate the video or image files to the conversation agent or system. In some implementations, the conversation agent or system may analyze, leverage and/or utilize the video input to assign voice input to a speaking user. In some implementations, one or more of the imaging devices or cameras may be a 360-degree camera or imaging device. In some implementations, the conversation agent or system may analyze and/or recognize a talking motion detection in a face, gesture or body and utilize this recognition to assign the voice input or files to the speaking users. In some implementations, it does not assign speech to other users that are not speaking because there are no video image files to support that the other users are speaking (e.g., assign input to a silent and quiet person in the room).

In some implementations, the conversation agent may receive sound or voice files and may assign the sound or voice files to a user or speaker. In some implementations, the conversation agent or system may store the assigned sound or voice files in one or more memory devices and these may be referred to as voice prints of the users. In some cases, the conversation agent or system may then compare other received sound or voice files and compare these to the stored voice prints of the already recorded users to determine if it is the same users. In some implementations, the conversation agent or system may assign the received sound or voice files to the same user if similarities or a match is found in speaker characteristics. In some implementations, the speaker characteristics may include spectral characteristics and/or prosody.

In some implementations, the conversation agent or system may leverage multimodal fusion in order to fine tune its assessment of who is speaking at what time in order to better assign speech to correct sources. Multimodal fusion is discussed in the patent application "Systems And Methods To Manage Communication Interactions Between A User And A Robot Computing Device," describes multimodal fusion. The system leverages multimodal fusion to refine its assessment of who is speaking at what time to better assign speech to the correct sources.

In some implementations, the conversation agent or system may have a first mode, where the conversation agent or system requires a single user to be alone and/or locked in engaging with computing device or conversation agent. An example of an activity in a first mode would be a learning exercise. In some implementations, the conversation agent or system may have a second mode that allows input from more than one users (e.g., a multiuser conversation interaction engaging in, for example, party games).

In some implementations, the conversation agent or system continuously and/or periodically monitors engagement of a user. In some implementations, in response to the agent determining the user is not engaged anymore, the conversation agent or system may reopen communication with other users in the environment (e.g., that have been identified in the world map, for example). In some implementations, the conversation agent or system may not filter out the sound files or voice files of the other users.

In some implementations, a conversation agent or system may assign an engagement level to users in the world map (which identifies users in an environment around the agent or system). In some implementations, the conversation agent or system may then establish a priority queue for interacting with the users, where the users with a higher engagement level will have a higher priority in interacting with the conversation agent or system. In some implementations, the engagement level may be determined by the conversation agent or system based on face recognition, voice identification, proximity, gestures and/or facial expressions.

In some implementations, the conversation agent or system may allow specified global commands and/or key phrases to turn on or off or modify or redirect the filtering of sound files and/or speech files. In some implementations, the conversation agent or system may allow specific commands to be spoken to override filtering decisions made by the conversation agent or system. In other words, the global commands and key phrases can filter out distracting input.

In some implementations, the conversation agent or system may receive all of the sound files and/or voice files from all of the users to be received and/or stored. In some implementations, the conversation agent or system may then post-process the received sound files and/or voice files from some or all of the users. In some implementations, the conversation agent or system may, post-process the input received from the users and assesses if a filtered out input should actually be processed dependent on the general context of the system (multiparty interactions, solo interaction, etc.).

In some implementations, the conversation agent or system may determine who it should engage in conversation interactions with (and thus be listening to). In some implementations, the conversation agent or system may target users to listen to by utilizing a multiplicity of outputs. In some implementations, the multiplicity of outputs may include, but not be limited to, a robot computing device's face, eye gaze, gestures, speech, LED light (e.g., like Alexa with the LED ring), movement, and/or motion in space.

In some implementations, the conversation agent may have a difficult time figuring out which user to listen to in a noisy environment. In some implementations, the conversation agent or system may utilize the one or more imaging devices to capture and/or track a mouth shape of user(s). In some implementations, the captured mouth shape of user(s) is then analyzed and/or interpreted utilizing lip reading in order to improve speech recognition results.

In some implementations, a conversation agent and/or system may move closer to an engaged user if the environment in which it is located is too noisy. In some implementations, the conversation agent and/or system may determine that the environment where the engaged user is located is too noisy and/or greater than an acceptable noise threshold. In some implementations, if the environment is too noisy, the conversation agent or system may move closer to the engaged user in order to reduce an amount of noise that is being captured by the one or more microphones. In some implementations, this may include moving the whole conversation agent or system closer to the user. In some implementations, this may include moving the head and/or neck or other portion of a conversation agent or system closer to the user. In some implementations, the conversation agent might move to directly face the user in order to enhance the engagement with the user.

In some implementations, the conversation agent and/or system may determine that the environment where the engaged user is located is too noisy and/or greater than an acceptable noise threshold. In some implementations, the conversation agent and/or system may utilize one of the output devices (e.g., the speaker) to request that the user move closer to the conversation agent and/or system and/or to change the environment in which conversation agent and/or system is located. This may include moving to a different section or place in the environment. In some implementations, this may include moving to a different environment (which could be a different room). In some implementations, this may reduce the amount of noise in the environment (e.g., make it quieter) and allow the conversation agent or system to communicate more efficiently.

In some implementations, the conversation agent and/or system may be able to have its focus, attention, orientation and/or location changed or modified utilizing global voice commands. In some implementations, the user may use global commands (such as "Look at me/her/that/them, etc.", "Listen to me/her/that/them, etc.", or "Focus on me/her/that/them, etc.") to manually or verbally change the focus, attention, orientation, and location of the conversational agent or system to pay attention to other input sources (including objects, radio, etc.) and to manually or verbally control the attention.

Figure 1B:
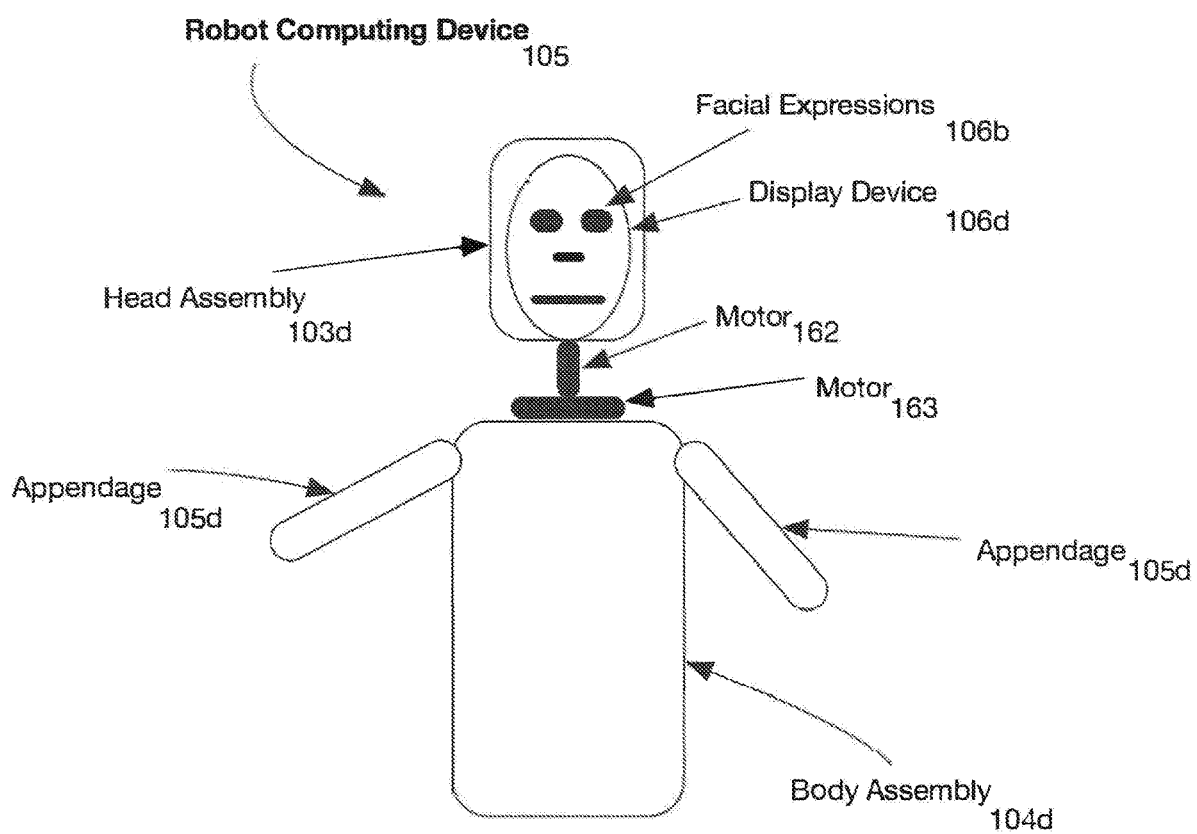
FIG. 1B illustrates a social robot or digital companion, in accordance with one or more implementations.
Figure 1C:
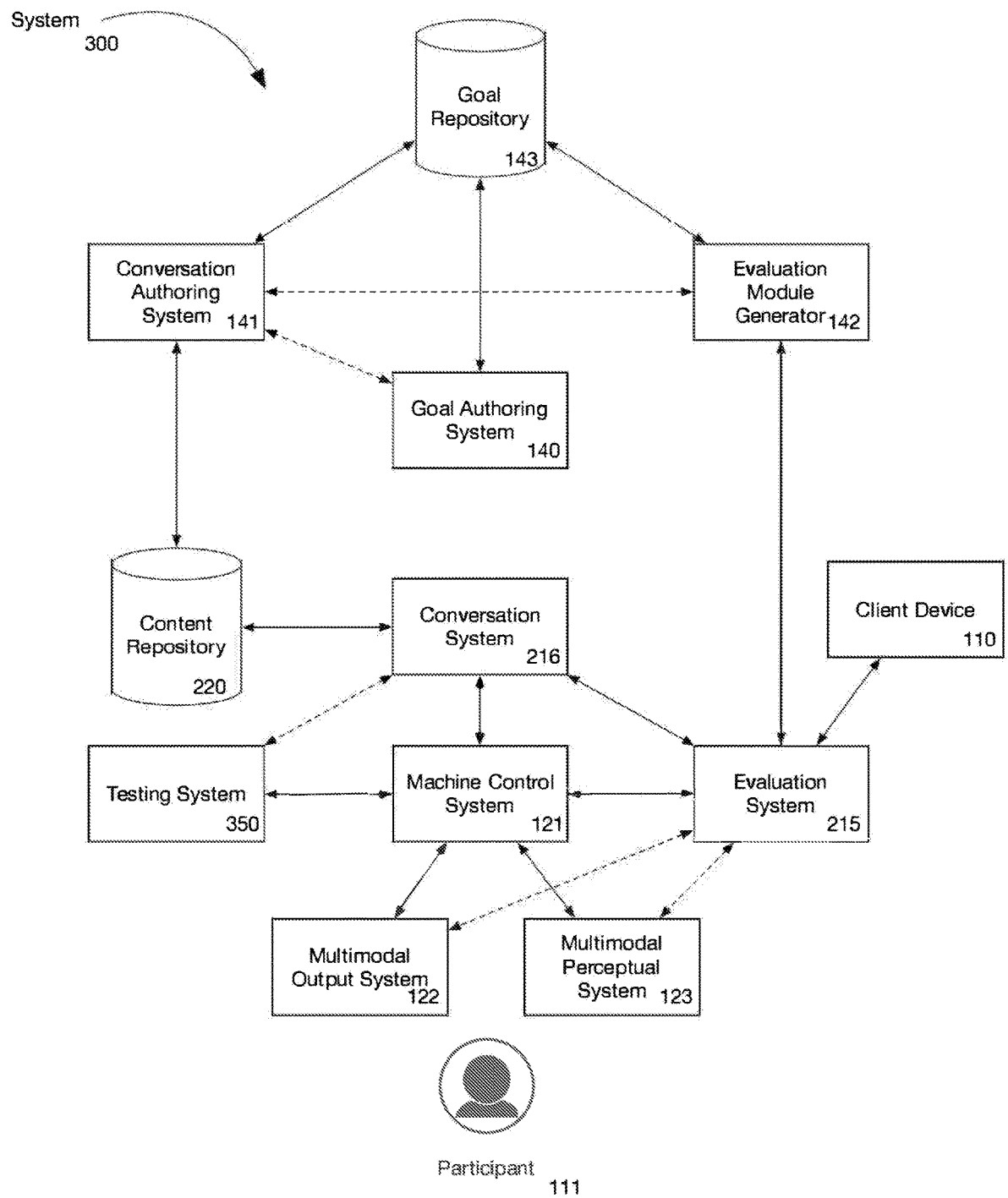
FIG. 1C illustrates modules or subsystems in a system where a child engages with a social robot or digital companion, in accordance with one or more implementations.

FIG. 1A illustrates a system for a social robot or digital companion to engage a child and/or a parent, in accordance with one or more implementations. FIG. 1C illustrates modules or subsystems in a system where a child engages with a social robot or digital companion, in accordance with one or more implementations. FIG. 1B illustrates a social robot or digital companion, in accordance with one or more implementations. In some implementations, a robot computing device 105 (or digital companion) may engage with a child and establish communication interactions with the child. In some implementations, there will be bidirectional communication between the robot computing device 105 and the child 111 with a goal of establishing multi-turn conversations (e.g., both parties taking conversation turns) in the communication interactions. In some implementations, the robot computing device 105 may communicate with the child via spoken words (e.g., audio actions), visual actions (movement of eyes or facial expressions on a display screen), and/or physical actions (e.g., movement of a neck or head or an appendage of a robot computing device). In some implementations, the robot computing device 105 may utilize imaging devices to evaluate a child's body language, a child's facial expressions and may utilize speech recognition software to evaluate and analyze the child's speech.

In some implementations, the child may also have one or more electronic devices 110. In some implementations, the one or more electronic devices 110 may allow a child to login to a website on a server computing device in order to access a learning laboratory and/or to engage in interactive games that are housed on the web site. In some implementations, the child's one or more computing devices 110 may communicate with cloud computing devices 115 in order to access the website 120. In some implementations, the website 120 may be housed on server computing devices. In some implementations, the website 120 may include the learning laboratory (which may be referred to as a global robotics laboratory (GRL) where a child can interact with digital characters or personas that are associated with the robot computing device 105. In some implementations, the website 120 may include interactive games where the child can engage in competitions or goal setting exercises. In some implementations, other users may be able to interface with an e-commerce website or program, where the other users (e.g., parents or guardians) may purchases items that are associated with the robot (e.g., comic books, toys, badges or other affiliate items).

In some implementations, the robot computing device or digital companion 105 may include one or more imaging devices, one or more microphones, one or more touch sensors, one or more IMU sensors, one or more motors and/or motor controllers, one or more display devices or monitors and/or one or more speakers. In some implementations, the robot computing devices may include one or more processors, one or more memory devices, and/or one or more wireless communication transceivers. In some implementations, computer-readable instructions may be stored in the one or more memory devices and may be executable to perform numerous actions, features and/or functions. In some implementations, the robot computing device may perform analytics processing on data, parameters and/or measurements, audio files and/or image files captured and/or obtained from the components of the robot computing device listed above.

In some implementations, the one or more touch sensors may measure if a user (child, parent or guardian) touches the robot computing device or if another object or individual comes into contact with the robot computing device. In some implementations, the one or more touch sensors may measure a force of the touch and/or dimensions of the touch to determine, for example, if it is an exploratory touch, a push away, a hug or another type of action. In some implementations, for example, the touch sensors may be located or positioned on a front and back of an appendage or a hand of the robot computing device or on a stomach area of the robot computing device. Thus, the software and/or the touch sensors may determine if a child is shaking a hand or grabbing a hand of the robot computing device or if they are rubbing the stomach of the robot computing device. In some implementations, other touch sensors may determine if the child is hugging the robot computing device. In some implementations, the touch sensors may be utilized in conjunction with other robot computing device software where the robot computing device could tell a child to hold their left hand if they want to follow one path of a story of hold a left hand if they want to follow the other path of a story.

In some implementations, the one or more imaging devices may capture images and/or video of a child, parent or guardian interacting with the robot computing device. In some implementations, the one or more imaging devices may capture images and/or video of the area around the child, parent or guardian. In some implementations, the one or more microphones may capture sound or verbal commands spoken by the child, parent or guardian. In some implementations, computer-readable instructions executable by the processor or an audio processing device may convert the captured sounds or utterances into audio files for processing.

In some implementations, the one or more IMU sensors may measure velocity, acceleration, orientation and/or location of different parts of the robot computing device. In some implementations, for example, the IMU sensors may determine a speed of movement of an appendage or a neck. In some implementations, for example, the IMU sensors may determine an orientation of a section or the robot computing device, for example of a neck, a head, a body or an appendage in order to identify if the hand is waving or In a rest position. In some implementations, the use of the IMU sensors may allow the robot computing device to orient its different sections in order to appear more friendly or engaging to the user.

In some implementations, the robot computing device may have one or more motors and/or motor controllers. In some implementations, the computer-readable instructions may be executable by the one or more processors and commands or instructions may be communicated to the one or more motor controllers to send signals or commands to the motors to cause the motors to move sections of the robot computing device. In some implementations, the sections may include appendages or arms of the robot computing device and/or a neck or a head of the robot computing device.

In some implementations, the robot computing device may include a display or monitor. In some implementations, the monitor may allow the robot computing device to display facial expressions (e.g., eyes, nose, mouth expressions) as well as to display video or messages to the child, parent or guardian.

In some implementations, the robot computing device may include one or more speakers, which may be referred to as an output modality. In some implementations, the one or more speakers may enable or allow the robot computing device to communicate words, phrases and/or sentences and thus engage in conversations with the user. In addition, the one or more speakers may emit audio sounds or music for the child, parent or guardian when they are performing actions and/or engaging with the robot computing device.

In some implementations, the system may include a parent computing device 125. In some implementations, the parent computing device 125 may include one or more processors and/or one or more memory devices. In some implementations, computer-readable instructions may be executable by the one or more processors to cause the parent computing device 125 to perform a number of features and/or functions. In some implementations, these features and functions may include generating and running a parent interface for the system. In some implementations, the software executable by the parent computing device 125 may also alter user (e.g., child, parent or guardian) settings. In some implementations, the software executable by the parent computing device 125 may also allow the parent or guardian to manage their own account or their child's account in the system. In some implementations, the software executable by the parent computing device 125 may allow the parent or guardian to initiate or complete parental consent to allow certain features of the robot computing device to be utilized. In some implementations, the software executable by the parent computing device 125 may allow a parent or guardian to set goals or thresholds or settings what is captured from the robot computing device and what is analyzed and/or utilized by the system. In some implementations, the software executable by the one or more processors of the parent computing device 125 may allow the parent or guardian to view the different analytics generated by the system in order to see how the robot computing device is operating, how their child is progressing against established goals, and/or how the child is interacting with the robot computing device.

In some implementations, the system may include a cloud server computing device 115. In some implementations, the cloud server computing device 115 may include one or more processors and one or more memory devices. In some implementations, computer-readable instructions may be retrieved from the one or more memory devices and executable by the one or more processors to cause the cloud server computing device 115 to perform calculations and/or additional functions. In some implementations, the software (e.g., the computer-readable instructions executable by the one or more processors) may manage accounts for all the users (e.g., the child, the parent and/or the guardian). In some implementations, the software may also manage the storage of personally identifiable information in the one or more memory devices of the cloud server computing device 115. In some implementations, the software may also execute the audio processing (e.g., speech recognition and/or context recognition) of sound files that are captured from the child, parent or guardian, as well as generating speech and related audio file that may be spoken by the robot computing device 115. In some implementations, the software in the cloud server computing device 115 may perform and/or manage the video processing of images that are received from the robot computing devices.

In some implementations, the software of the cloud server computing device 115 may analyze received inputs from the various sensors and/or other input modalities as well as gather information from other software applications as to the child's progress towards achieving set goals. In some implementations, the cloud server computing device software may be executable by the one or more processors in order perform analytics processing. In some implementations, analytics processing may be behavior analysis on how well the child is doing with respect to established goals.

In some implementations, the software of the cloud server computing device may receive input regarding how the user or child is responding to content, for example, does the child like the story, the augmented content, and/or the output being generated by the one or more output modalities of the robot computing device. In some implementations, the cloud server computing device may receive the input regarding the child's response to the content and may perform analytics on how well the content is working and whether or not certain portions of the content may not be working (e.g., perceived as boring or potentially malfunctioning or not working).

In some implementations, the software of the cloud server computing device may receive inputs such as parameters or measurements from hardware components of the robot computing device such as the sensors, the batteries, the motors, the display and/or other components. In some implementations, the software of the cloud server computing device may receive the parameters and/or measurements from the hardware components and may perform IOT Analytics processing on the received parameters, measurements or data to determine if the robot computing device is malfunctioning and/or not operating at an optimal manner.

In some implementations, the cloud server computing device 115 may include one or more memory devices. In some implementations, portions of the one or more memory devices may store user data for the various account holders. In some implementations, the user data may be user address, user goals, user details and/or preferences. In some implementations, the user data may be encrypted and/or the storage may be a secure storage.

FIG. 1C illustrates functional modules of a system including a robot computing device according to some implementations. In some embodiments, at least one method described herein is performed by a system 300 that includes the conversation system 126, a machine control system 121, a multimodal output system 122, a multimodal perceptual system 123, and an evaluation system 215. In some implementations, at least one of the conversation system 216, a machine control system 121, a multimodal output system 122, a multimodal perceptual system 123, and an evaluation system 215 may be included in a robot computing device or a machine. In some embodiments, the machine is a robot. In some implementations, the conversation system 216 may be communicatively coupled to control system 121 of the machine. In some embodiments, the conversation system may be communicatively coupled to the evaluation system 215. In some implementations, the conversation system 216 may be communicatively coupled to a conversational content repository 220. In some implementations, the conversation system 216 may be communicatively coupled to a conversation testing system. In some implementations, the conversation system 216 may be communicatively coupled to a conversation authoring system 360. In some implementations, the conversation system 216 may be communicatively coupled to a goal authoring system 140. In some implementations, the conversation system 216 may be a cloud-based conversation system provided by a conversation system server that is communicatively coupled to the control system 121 via the Internet. In some implementations, the conversation system may be the Embodied Chat Operating System.

In some implementations, the conversation system 216 may be an embedded conversation system that is included in the robot computing device or implementations. In some implementations, the control system 121 may be constructed to control a multimodal output system 122 and a multi modal perceptual system 123 that includes at least one sensor. In some implementations, the control system 121 may be constructed to interact with the conversation system 216. In some implementations, the machine or robot computing device may include the multimodal output system 122. In some implementations, the multimodal output system 122 may include at least one of an audio output sub-system, a video display sub-system, a mechanical robotic subsystem, a light emission sub-system, a LED (Light Emitting Diode) ring, and/or a LED (Light Emitting Diode) array. In some implementations, the machine or robot computing device may include the multimodal perceptual system 123, wherein the multimodal perceptual system 123 may include the at least one sensor. In some implementations, the multimodal perceptual system 123 includes at least one of a sensor of a heat detection sub-system, a sensor of a video capture sub-system, a sensor of an audio capture sub-system, a touch sensor, a piezoelectric pressor sensor, a capacitive touch sensor, a resistive touch sensor, a blood pressure sensor, a heart rate sensor, and/or a biometric sensor. In some implementations, the evaluation system 215 may be communicatively coupled to the control system 121. In some implementations, the evaluation system 130 may be communicatively coupled to the multimodal output system 122. In some implementations, the evaluation system 215 may be communicatively coupled to the multimodal perceptual system 123. In some implementations, the evaluation system 215 may be communicatively coupled to the conversation system 216. In some implementations, the evaluation system 215 may be communicatively coupled to a client device 110 (e.g., a parent or guardian's mobile device or computing device). In some implementations, the evaluation system 215 may be communicatively coupled to the goal authoring system 140. In some implementations, the evaluation system 215 may include computer-readable-instructions of a goal evaluation module that, when executed by the evaluation system, may control the evaluation system 215 to process information generated from the multimodal perceptual system 123 to evaluate a goal associated with conversational content processed by the conversation system 216. In some implementations, the goal evaluation module is generated based on information provided by the goal authoring system 140.

In some implementations, the goal evaluation module 215 may be generated based on information provided by the conversation authoring system 160. In some embodiments, the goal evaluation module 215 may be generated by an evaluation module generator 142. In some implementations, the conversation testing system may receive user input from a test operator and may provide the control system 121 with multimodal output instructions (either directly or via the conversation system 216). In some implementations, the conversation testing system 350 may receive event information indicating a human response sensed by the machine or robot computing device (either directly from the control system 121 or via the conversation system 216). In some implementations, the conversation authoring system 141 may be constructed to generate conversational content and store the conversational content in one of the content repository 220 and the conversation system 216. In some implementations, responsive to updating of content currently used by the conversation system 216, the conversation system may be constructed to store the updated content at the content repository 220.

In some embodiments, the goal authoring system 140 may be constructed to generate goal definition information that is used to generate conversational content. In some implementations, the goal authoring system 140 may be constructed to store the generated goal definition information in a goal repository 143. In some implementations, the goal authoring system 140 may be constructed to provide the goal definition information to the conversation authoring system 141. In some implementations, the goal authoring system 143 may provide a goal definition user interface to a client device that includes fields for receiving user-provided goal definition information. In some embodiments, the goal definition information specifies a goal evaluation module that is to be used to evaluate the goal. In some implementations, each goal evaluation module is at least one of a sub-system of the evaluation system 215 and a sub-system of the multimodal perceptual system 123. In some embodiments, each goal evaluation module uses at least one of a sub-system of the evaluation system 215 and a sub-system of the multimodal perceptual system 123. In some implementations, the goal authoring system 140 may be constructed to determine available goal evaluation modules by communicating with the machine or robot computing device, and update the goal definition user interface to display the determined available goal evaluation modules.

In some implementations, the goal definition information defines goal levels for goal. In some embodiments, the goal authoring system 140 defines the goal levels based on information received from the client device (e.g., user-entered data provided via the goal definition user interface). In some embodiments, the goal authoring system 140 automatically defines the goal levels based on a template. In some embodiments, the goal authoring system 140 automatically defines the goal levels-based information provided by the goal repository 143, which stores information of goal levels defined form similar goals. In some implementations, the goal definition information defines participant support levels for a goal level. In some embodiments, the goal authoring system 140 defines the participant support levels based on information received from the client device (e.g., user-entered data provided via the goal definition user interface). In some implementations, the goal authoring system 140 may automatically define the participant support levels based on a template. In some embodiments, the goal authoring system 140 may automatically define the participant support levels based on information provided by the goal repository 143, which stores information of participant support levels defined form similar goal levels. In some implementations, conversational content includes goal information indicating that a specific goal should be evaluated, and the conversational system 216 may provide an instruction to the evaluation system 215 (either directly or via the control system 121) to enable the associated goal evaluation module at the evaluation system 215. In a case where the goal evaluation module is enabled, the evaluation system 215 executes the instructions of the goal evaluation module to process information generated from the multimodal perceptual system 123 and generate evaluation information. In some implementations, the evaluation system 215 provides generated evaluation information to the conversation system 215 (either directly or via the control system 121). In some implementations, the evaluation system 215 may update the current conversational content at the conversation system 216 or may select new conversational content at the conversation system 100 (either directly or via the control system 121), based on the evaluation information FIG. 1B illustrates a robot computing device according to some implementations. In some implementations, the robot computing device 105 may be a machine, a digital companion, an electro-mechanical device including computing devices. These terms may be utilized interchangeably in the specification. In some implementations, as shown in FIG. 1B, the robot computing device 105 may include a head assembly 103d, a display device 106d, at least one mechanical appendage 105d (two are shown in FIG. 1B), a body assembly 104d, a vertical axis rotation motor 163, and/or a horizontal axis rotation motor 162. In some implementations, the robot computing device may include a multimodal output system 122 and the multimodal perceptual system 123 (not shown in FIG. 1B, but shown in FIG. 2 below). In some implementations, the display device 106d may allow facial expressions 106b to be shown or illustrated after being generated. In some implementations, the facial expressions 106b may be shown by the two or more digital eyes, a digital nose and/or a digital mouth. In some implementations, other images or parts may be utilized to show facial expressions. In some implementations, the horizontal axis rotation motor 163 may allow the head assembly 103d to move from side-to-side which allows the head assembly 103d to mimic human neck movement like shaking a human's head from side-to-side. In some implementations, the vertical axis rotation motor 162 may allow the head assembly 103d to move in an up-and-down direction like shaking a human's head up and down. In some implementations, an additional motor may be utilized to move the robot computing device (e.g., the entire robot or computing device) to a new position or geographic location in a room or space (or even another room). In this implementation, the additional motor may be connected to a drive system that causes wheels, tires or treads to rotate and thus physically move the robot computing device.

In some implementations, the body assembly 104d may include one or more touch sensors. In some implementations, the body assembly's touch sensor(s) may allow the robot computing device to determine if it is being touched or hugged. In some implementations, the one or more appendages 105d may have one or more touch sensors. In some implementations, some of the one or more touch sensors may be located at an end of the appendages 105d (which may represent the hands). In some implementations, this allows the robot computing device 105 to determine if a user or child is touching the end of the appendage (which may represent the user shaking the user's hand).

Figure 2:
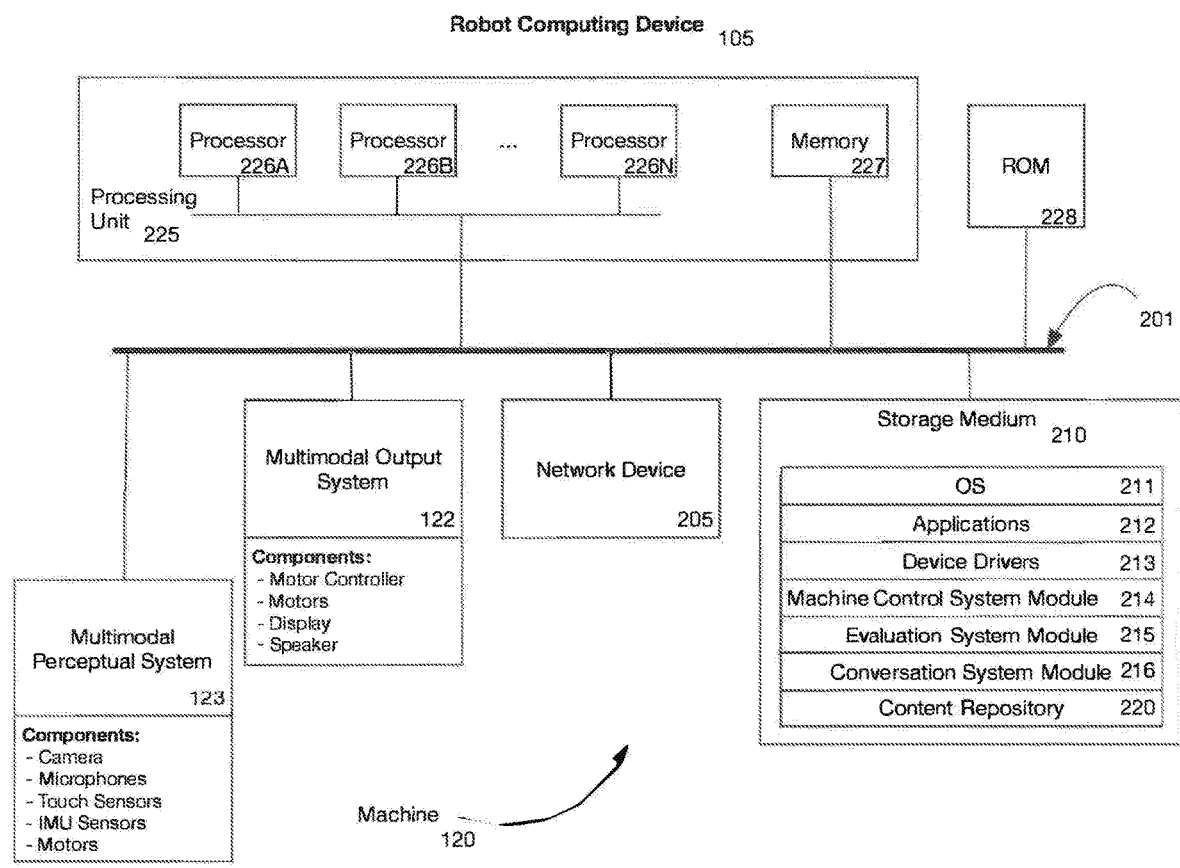
FIG. 2 illustrates a system architecture of an exemplary robot computing device, according to some implementations.

FIG. 2 is a diagram depicting system architecture of robot computing device (e.g., 105 of FIG. 1B), according to implementations. In some implementations, the robot computing device or system of FIG. 2 may be implemented as a single hardware device. In some implementations, the robot computing device and system of FIG. 2 may be implemented as a plurality of hardware devices. In some implementations, the robot computing device and system of FIG. 2 may be implemented as an ASIC (Application-Specific Integrated Circuit). In some implementations, the robot computing device and system of FIG. 2 may be implemented as an FPGA (Field-Programmable Gate Array). In some implementations, the robot computing device and system of FIG. 2 may be implemented as a SoC (System-on-Chip). In some implementations, the bus 201 may interface with the processors 226A-N, the main memory 227 (e.g., a random access memory (RAM)), a read only memory (ROM) 228, one or more processor-readable storage mediums 210, and one or more network device 211. In some implementations, bus 201 interfaces with at least one of a display device (e.g., 102c) and a user input device. In some implementations, bus 101 interfaces with the multimodal output system 122. In some implementations, the multimodal output system 122 may include an audio output controller. In some implementations, the multimodal output system 122 may include a speaker. In some implementations, the multimodal output system 122 may include a display system or monitor. In some implementations, the multimodal output system 122 may include a motor controller. In some implementations, the motor controller may be constructed to control the one or more appendages (e.g., 105d) of the robot system of FIG. 1B. In some implementations, the motor controller may be constructed to control a motor of an appendage (e.g., 105d) of the robot system of FIG. 1B. In some implementations, the motor controller may be constructed to control a motor (e.g., a motor of a motorized, a mechanical robot appendage).

In some implementations, a bus 201 may interface with the multimodal perceptual system 123 (which may be referred to as a multimodal input system or multimodal input modalities. In some implementations, the multimodal perceptual system 123 may include one or more audio input processors. In some implementations, the multimodal perceptual system 123 may include a human reaction detection sub-system. In some implementations, the multimodal perceptual system 123 may include one or more microphones. In some implementations, the multimodal perceptual system 123 may include one or more camera(s) or imaging devices.

In some implementations, the one or more processors 226A-226N may include one or more of an ARM processor, an X86 processor, a GPU (Graphics Processing Unit), and the like. In some implementations, at least one of the processors may include at least one arithmetic logic unit (ALU) that supports a SIMD (Single Instruction Multiple Data) system that provides native support for multiply and accumulate operations.

In some implementations, at least one of a central processing unit (processor), a GPU, and a multi-processor unit (MPU) may be included. In some implementations, the processors and the main memory form a processing unit 225. In some implementations, the processing unit 225 includes one or more processors communicatively coupled to one or more of a RAM, ROM, and computer-readable storage medium; the one or more processors of the processing unit receive instructions stored by the one or more of a RAM, ROM, and computer-readable storage medium via a bus; and the one or more processors execute the received instructions. In some implementations, the processing unit is an ASIC (Application-Specific Integrated Circuit).

In some implementations, the processing unit may be a SoC (System-on-Chip). In some implementations, the processing unit may include at least one arithmetic logic unit (ALU) that supports a SIMD (Single Instruction Multiple Data) system that provides native support for multiply and accumulate operations. In some implementations the processing unit is a Central Processing Unit such as an Intel Xeon processor. In other implementations, the processing unit includes a Graphical Processing Unit such as NVIDIA Tesla.

In some implementations, the one or more network adapter devices or network interface devices 205 may provide one or more wired or wireless interfaces for exchanging data and commands. Such wired and wireless interfaces include, for example, a universal serial bus (USB) interface, Bluetooth interface, Wi-Fi interface, Ethernet interface, near field communication (NFC) interface, and the like. In some implementations, the one or more network adapter devices or network interface devices 205 may be wireless communication devices. In some implementations, the one or more network adapter devices or network interface devices 205 may include personal area network (PAN) transceivers, wide area network communication transceivers and/or cellular communication transceivers.

In some implementations, the one or more network devices 205 may be communicatively coupled to another robot computing device (e.g., a robot computing device similar to the robot computing device 105 of FIG. 1B). In some implementations, the one or more network devices 205 may be communicatively coupled to an evaluation system module (e.g., 215). In some implementations, the one or more network devices 205 may be communicatively coupled to a conversation system module (e.g., 110). In some implementations, the one or more network devices 205 may be communicatively coupled to a testing system. In some implementations, the one or more network devices 205 may be communicatively coupled to a content repository (e.g., 220). In some implementations, the one or more network devices 205 may be communicatively coupled to a client computing device (e.g., 110). In some implementations, the one or more network devices 205 may be communicatively coupled to a conversation authoring system (e.g., 160). In some implementations, the one or more network devices 205 may be communicatively coupled to an evaluation module generator. In some implementations, the one or more network devices may be communicatively coupled to a goal authoring system. In some implementations, the one or more network devices 205 may be communicatively coupled to a goal repository. In some implementations, machine-executable or computer-executable instructions in software programs (such as an operating system 211, application programs 212, and device drivers 213) may be loaded into the one or more memory devices (of the processing unit) from the processor-readable storage medium, the ROM or any other storage location. During execution of these software programs, the respective machine-executable or computer-executable instructions may be accessed by at least one of processors 226A-226N (of the processing unit) via the bus 201, and then may be executed by at least one of processors. Data used by the software programs may also be stored in the one or more memory devices, and such data is accessed by at least one of one or more processors 226A-226N during execution of the machine-executable or computer-executable instructions of the software programs.

In some implementations, the processor-readable storage medium 210 may be one of (or a combination of two or more of) a hard drive, a flash drive, a DVD, a CD, an optical disk, a floppy disk, a flash storage, a solid state drive, a ROM, an EEPROM, an electronic circuit, a semiconductor memory device, and the like. In some implementations, the processor-readable storage medium 210 may include machine-executable or computer-executable instructions (and related data) for an operating system 211, software programs or application software 212, device drivers 213, and machine-executable or computer-readable instructions for one or more of the processors 226A-226N of FIG. 2.

In some implementations, the processor-readable storage medium 210 may include a machine control system module 214 that includes machine-executable or computer-executable instructions for controlling the robot computing device to perform processes performed by the machine control system, such as moving the head assembly of robot computing device.

In some implementations, the processor-readable storage medium 210 may include an evaluation system module 215 that includes machine-executable or computer-executable instructions for controlling the robotic computing device to perform processes performed by the evaluation system. In some implementations, the processor-readable storage medium 210 may include a conversation system module 216 that may include machine-executable or computer-executable instructions for controlling the robot computing device 105 to perform processes performed by the conversation system. In some implementations, the processor-readable storage medium 210 may include machine-executable or computer-executable instructions for controlling the robot computing device 105 to perform processes performed by the testing system. In some implementations, the processor-readable storage medium 210, machine-executable or computer-executable instructions for controlling the robot computing device 105 to perform processes performed by the conversation authoring system.

In some implementations, the processor-readable storage medium 210, machine-executable or computer-executable instructions for controlling the robot computing device 105 to perform processes performed by the goal authoring system. In some implementations, the processor-readable storage medium 210 may include machine-executable or computer-executable instructions for controlling the robot computing device 105 to perform processes performed by the evaluation module generator.

In some implementations, the processor-readable storage medium 210 may include the content repository 220. In some implementations, the processor-readable storage medium 210 may include the goal repository 180. In some implementations, the processor-readable storage medium 210 may include machine-executable or computer-executable instructions for an emotion detection module. In some implementations, emotion detection module may be constructed to detect an emotion based on captured image data (e.g., image data captured by the perceptual system 123 and/or one of the imaging devices). In some implementations, the emotion detection module may be constructed to detect an emotion based on captured audio data (e.g., audio data captured by the perceptual system 123 and/or one of the microphones). In some implementations, the emotion detection module may be constructed to detect an emotion based on captured image data and captured audio data. In some implementations, emotions detectable by the emotion detection module include anger, contempt, disgust, fear, happiness, neutral, sadness, and surprise. In some implementations, emotions detectable by the emotion detection module include happy, sad, angry, confused, disgusted, surprised, calm, unknown. In some implementations, the emotion detection module is constructed to classify detected emotions as either positive, negative, or neutral. In some implementations, the robot computing device 105 may utilize the emotion detection module to obtain, calculate or generate a determined emotion classification (e.g., positive, neutral, negative) after performance of an action by the machine, and store the determined emotion classification in association with the performed action (e.g., in the storage medium 210).

In some implementations, the testing system may a hardware device or computing device separate from the robot computing device, and the testing system includes at least one processor, a memory, a ROM, a network device, and a storage medium (constructed in accordance with a system architecture similar to a system architecture described herein for the machine 120), wherein the storage medium stores machine-executable or computer-executable instructions for controlling the testing system 150 to perform processes performed by the testing system, as described herein.

In some implementations, the conversation authoring system may be a hardware device separate from the robot computing device 105, and the conversation authoring system may include at least one processor, a memory, a ROM, a network device, and a storage medium (constructed in accordance with a system architecture similar to a system architecture described herein for the robot computing device 105), wherein the storage medium stores machine-executable or computer-executable instructions for controlling the conversation authoring system to perform processes performed by the conversation authoring system.

In some implementations, the evaluation module generator may be a hardware device separate from the robot computing device 105, and the evaluation module generator may include at least one processor, a memory, a ROM, a network device, and a storage medium (constructed in accordance with a system architecture similar to a system architecture described herein for the robot computing device), wherein the storage medium stores machine-executable or computer-executable instructions for controlling the evaluation module generator to perform processes performed by the evaluation module generator, as described herein.

In some implementations, the goal authoring system may be a hardware device separate from the robot computing device, and the goal authoring system may include at least one processor, a memory, a ROM, a network device, and a storage medium (constructed in accordance with a system architecture similar to a system architecture described instructions for controlling the goal authoring system to perform processes performed by the goal authoring system. In some implementations, the storage medium of the goal authoring system may include data, settings and/or parameters of the goal definition user interface described herein. In some implementations, the storage medium of the goal authoring system may include machine-executable or computer-executable instructions of the goal definition user interface described herein (e.g., the user interface). In some implementations, the storage medium of the goal authoring system may include data of the goal definition information described herein (e.g., the goal definition information). In some implementations, the storage medium of the goal authoring system may include machine-executable or computer-executable instructions to control the goal authoring system to generate the goal definition information described herein (e.g., the goal definition information).

Figure 3A:
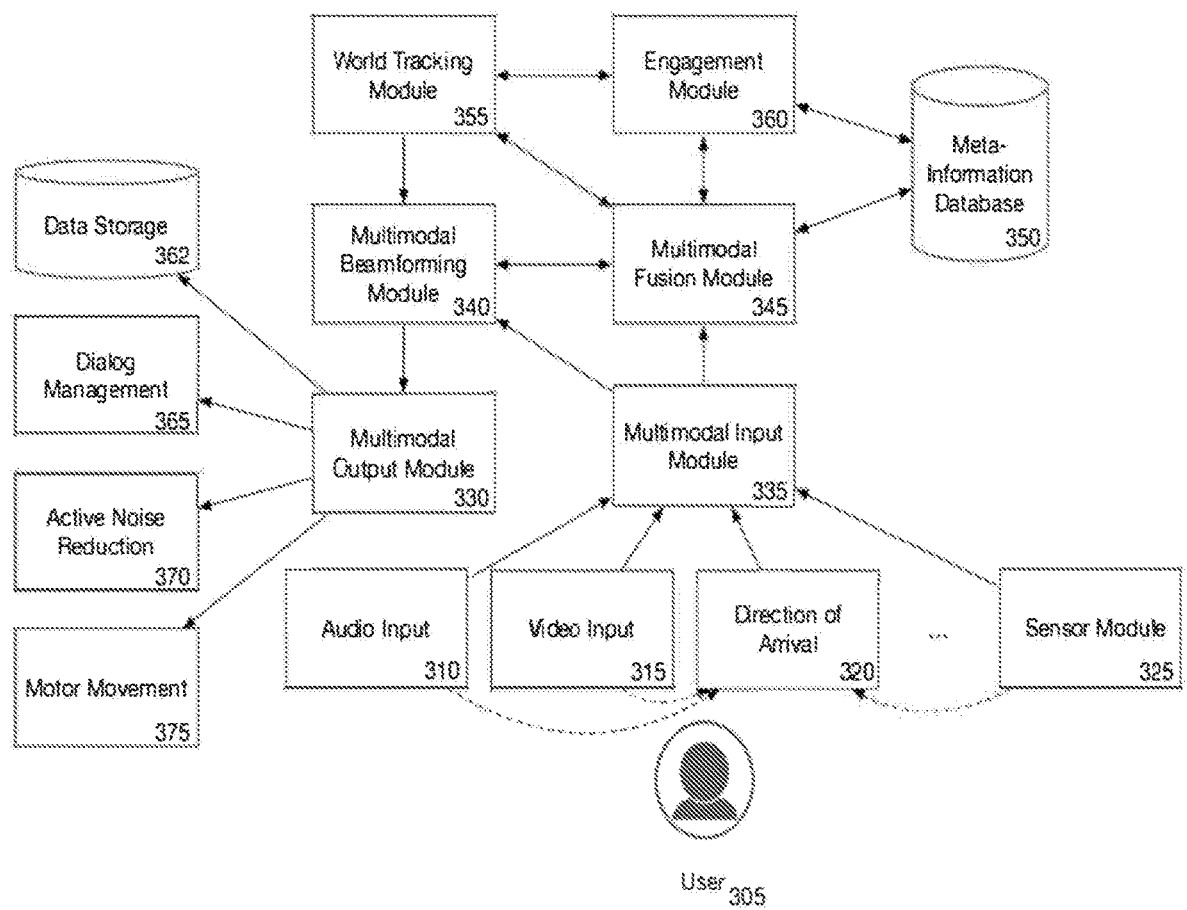
FIG. 3A illustrates modules in a multimodal beamforming and attention filtering system, according to some implementations.

FIG. 3A illustrates modules in a multimodal beamforming and attention filtering system according to some implementations. In some implementations, the computing device including the multimodal beamforming and attention filtering system 300 includes a data storage module 362, a dialog management module 365, an active noise reduction module 370, a motor movement module 375; an audio input module 310, a video input module 315, a direction of arrival module 320, and/or a sensor module 325, a radar sensor module, an infrared and/or thermal imaging device module, a 3D imaging device. In some implementations, the computing device including the multimodal beamforming and attention filter system 300 includes a multimodal output module 330, a multimodal input module 335, a multimodal fusion module 345, a multimodal beamforming module 340, a world tracking module 355, an engagement module 360 and/or a meta-information database 350.

In some implementations, the audio input module 310 of multimodal beamforming and attention filtering system 300 may receive audio file or voice files from one or more microphones or a microphone array and may communicate the audio files or voice files to the multimodal input module 335. In some implementations, the video input module 315 may receive video files and/or image files from one or more imaging devices in the environment around the computing device that includes the conversation agent and/or the multimodal beamforming and attention filtering system. In some implementations, the video input module 315 may communicate the received video files and/or image files to the multimodal input module 335. In some implementations, the direction of arrival module 320 may receive measurements and/or parameters that identify time of arrival of signals on the different microphones in the microphone array (from the audio input module 310). In some implementations, the direction of arrival module 320 may calculate direction of arrival measurements based on the received time of arrival signals from the different microphones. In some implementations, video information, parameters from the video input module 315, and/or other sensors, such as the LIDAR system 325, may be utilized to further refine the precision of the direction of arrival measurements.

In some implementations, the sensor module 325 may receive LIDAR Sensor measurements for one or more LIDAR sensors. In some embodiments, the measurements may identify locations (e.g., be location measurements) of where objects and/or users are around the computing device including multimodal beamforming and attention filtering system. In some embodiments, a sensor module 325 may receive radar sensor measurements and/or proximity measurements, which also identify locations of where objects and/or users are around the computing device including the multimodal beamforming and attention filtering system. In some implementations, a sensor module may receive measurements and/or images representing users and/or objects in an area around the multimodal beamforming and attention filtering system. In some implementations, a 3D imaging device may receive measurements and/or images representing users and/or objects in an area around the multimodal beamforming and attention filtering system. These measurements and/or images identify where users and/or objects may be located in the environment. In some implementations, a proximity sensor may be utilized rather than one of the sensors or imaging devices. In some implementations, the LIDAR sensor measurements, the RADAR sensor measurements, the proximity sensor measurements, the thermal and/or infrared measurements and/or images, the 3D images may be communicated via the respective modules to the multimodal input module 335. In some implementations, the multimodal input module 335 may process and/or gather the different images and/or measurements of the LIDAR Sensor, Radar Sensor, Thermal or Infrared Imaging, or 3D imaging devices. In some implementations, the multimodal input module 335 may communicate the different measurements and/or images to the multimodal beamforming module 340 and/or the multimodal fusion module 345.

In some implementations, the multimodal output module 330 may communicate with the motor movement module 375, the active noise reduction module 370, the dialog management module 365 and/or the data storage module 362. In some implementations, the multimodal output module 330 may receive instructions, commands, and/or files from the multimodal beamforming module 340.

In some implementations, the data storage module 362 may be a database that stores information about the instructions, commands, messages and/or files that are communicated from the multimodal output module 330. In some implementations, this means that the data storage may include for example voice prints of users, images of users, and/or command strings.

In some implementations, the dialog management module 365 is utilized to manage long- and short-term conversation interactions. The dialog management module 365 is described in commonly owned patent application entitled "Systems and Methods for Short- and Long-term Dialog Management Between a Robot Computing Device/Digital Companion and a User," which is incorporated by reference.

In some implementations, the active noise reduction module 370 may generate instructions and/or commands to communicate to other modules, systems or components to reduce the noise in an incoming voice files or sound files. In some implementations, the active noise reduction module 370 may filter out voice files and/or sound files.

In some implementations, the motor movement module 370 may generate instructions, messages or commands to communicate to one or more motor controllers in a computing device that includes a conversation agent or system. In some implementations, the instructions, messages or commands may tell the computing device to move closer to or face the users that are engaged. In some implementations, the instructions, messages or commands may tell the computing device to move to a different area of the room to enhance the conversation interaction with the one or more users.

In some implementations, the multimodal input module 335 may communicate the received audio or sound files, the video or image files, the direction of arrival parameters or measurements, the lidar sensor parameters or measurements, the radar sensor parameters or measurements, the proximity sensor parameters or measurements, the thermal or infrared cameras files and/or measurements, the 3D images to the multimodal fusion module 345. In some implementations, the multimodal fusion module 345 may utilize the received information to manage conversation interactions. The multimodal fusion module's operation is also explained in patent application entitled "Systems and Methods for Managing Conversation Interactions with Between a User and A Robot Computing Device or Conversation Agent." In some implementations, the multimodal fusion module 345 may communicate communication interaction parameters, measurements and/or logs to the meta-information database 350, the engagement module 360, and/or the world tracking module 355.

In some implementations, the meta-information database 350 may include characteristics of the one or more users, in order to assist the conversation agent or system in focusing on and engage with the users. In some information, the meta-information may include a user's identity, a user's history in communicating with the conversation agent, a current priority status and/or a past priority status (e.g., main user), average time interacting with the conversation agent, a current and/or past engagement level.

In some implementations, the engagement module 360 may utilize information, parameters and/or measurements from the multimodal fusion module 345 and/or a world tracking module 355 to identify which users are engaged with the computing device that includes the conversation agent or system. In some implementations, the engagement module 360 utilizes audio information and/or video image information and analyzes a user's face (or facial expressions), eye gaze, gestures, speech, movement, and motion in space.

In some implementations, the world tracking module 355 receives information, parameters and/or files from the multimodal fusion module 345. In some implementations, the world tracking module 355 generates the world map that identifies users and/or objects in the environment around the computing device that include the conversation agent or system. In other words, it analyzes the video input, direction of arrival sound information, the sensor (lidar, radar, proximity) input and/or imaging devices files or input in order to generate the world map. In some implementations, the world map may be stored in the data storage 362 and/or the meta-information database 350. In some implementations, the world tracking module 355 may automatically update the world map on a periodic or continuous basis. In some implementations, the world tracking module 355 may communicate the world map to the multimodal beamforming module 340. In some implementations, this allows the multimodal beamforming module to know where all of the users or objects are in the environment. By knowing the positioning of the users or objects, this allows the multimodal beamforming module 340 to generate the commands, instructions or files to the multimodal output module to cause events or actions to occur (e.g., filtering of sound, engaging certain users in conversation interactions, causing the computing device or portions of the computing device to move to improve the conversation interaction with the one or more user(s)).

Figure 3B:
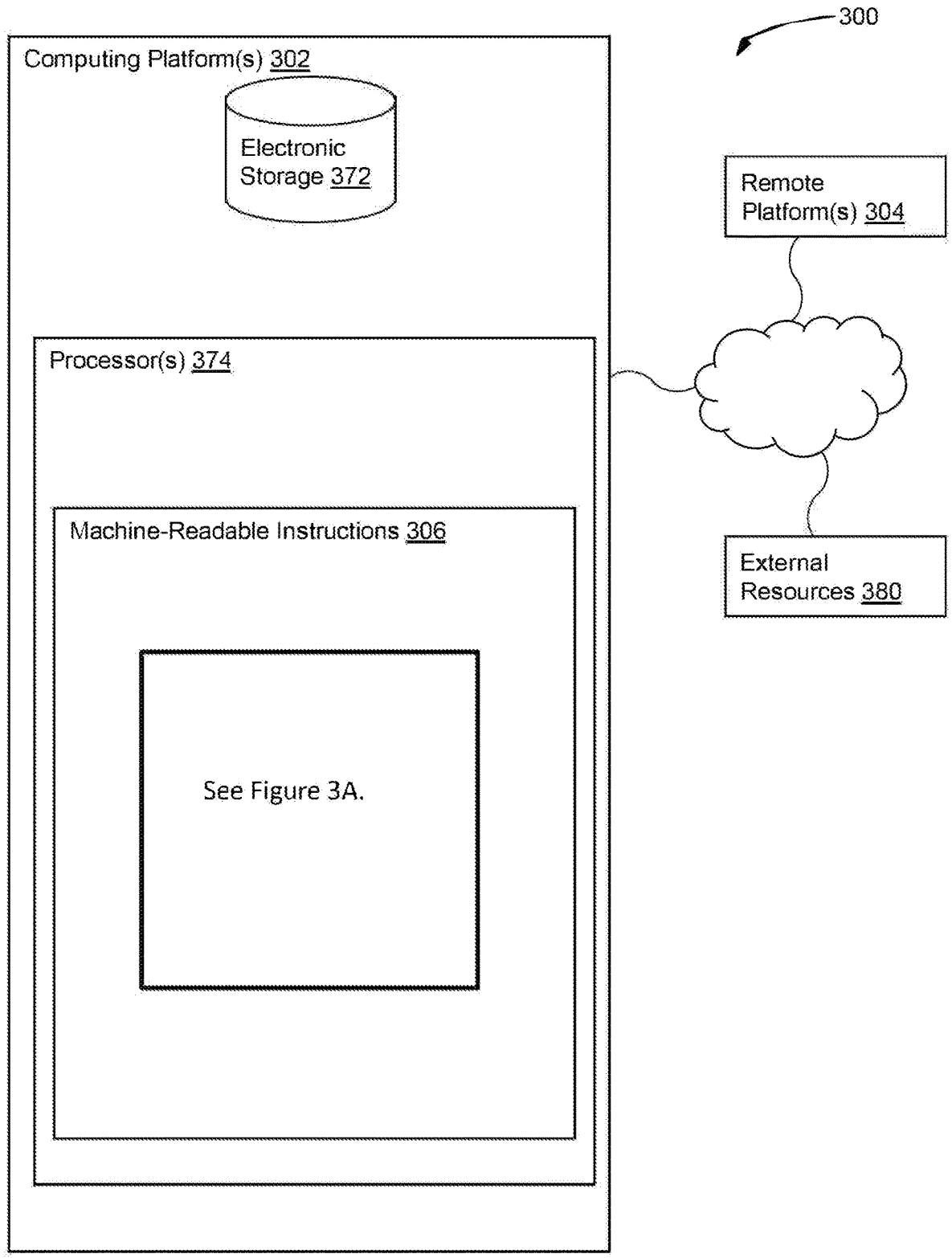
FIG. 3B illustrates a system configured for creating a view of an environment, in accordance with one or more implementations.

FIG. 3B illustrates a system 300 configured for creating a view of an environment, in accordance with one or more implementations. In some implementations, system 300 may include one or more computing platforms 302. Computing platform(s) 302 may be configured to communicate with one or more remote platforms 304 according to a client/server architecture, a peer-to-peer architecture, and/or other architectures. Remote platform(s) 304 may be configured to communicate with other remote platforms via computing platform(s) 302 and/or according to a client/server architecture, a peer-to-peer architecture, and/or other architectures. Users may access system 300 via remote platform(s) 304. One or more components described in connection with system 300 may be the same as or similar to one or more components described in connection with FIGS. 1, 1A, 1B, and 2. For example, in some implementations, computing platform(s) 302 and/or remote platform(s) 304 may be the same as or similar to one or more of the robot computing device 105, the one or more electronic devices 110, the cloud server computing device 115, the parent computing device 125, and/or other components.

Computing platform(s) 302 may be configured by computer-readable instructions 306. Computer-readable instructions 306 may include one or more instruction modules. The instruction modules may include computer program modules. The instruction modules may include one or more of a data storage module 362, a dialog management module 365, an active noise reduction module 370, a motor movement module 375; an audio module 310, a video input module 315, a direction of arrival module 320, and/or a sensor module 325, a radar sensor module, an infrared and/or thermal imaging device module, a 3D imaging device model. In some implementations, the computing device including the multimodal beamforming and attention filter system 300 includes a multimodal output module 330, a multimodal input module 335, a multimodal fusion module 345, a multimodal beamforming module 340, a world tracking module 355, an engagement module 360 and/or a meta-information database 350, and/or other instruction modules.

In some implementations, computing platform(s) 302, remote platform(s) 304, and/or external resources 380 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 302, remote platform(s) 304, and/or external resources 380 may be operatively linked via some other communication media.

A given remote platform 304 may include one or more processors configured to execute computer program modules. The computer program modules may be configured to enable an expert or user associated with the given remote platform 304 to interface with system 300 and/or external resources 380, and/or provide other functionality attributed herein to remote platform(s) 304. By way of non-limiting example, a given remote platform 304 and/or a given computing platform 302 may include one or more of a server, a desktop computer, a laptop computer, a handheld computer, a tablet computing platform, a NetBook, a Smartphone, a gaming console, and/or other computing platforms.

External resources 380 may include sources of information outside of system 300, external entities participating with system 300, and/or other resources. In some implementations, some or all of the functionality attributed herein to external resources 380 may be provided by resources included in system 300.

Computing platform(s) 302 may include electronic storage 372, one or more processors 374, and/or other components. Computing platform(s) 302 may include communication lines, or ports to enable the exchange of information with a network and/or other computing platforms. Illustration of computing platform(s) 302 in FIG. 3B is not intended to be limiting. Computing platform(s) 302 may include a plurality of hardware, software, and/or firmware components operating together to provide the functionality attributed herein to computing platform(s) 302. For example, computing platform(s) 302 may be implemented by a cloud of computing platforms operating together as computing platform(s) 302.

Electronic storage 372 may comprise non-transitory storage media that electronically stores information. The electronic storage media of electronic storage 372 may include one or both of system storage that is provided integrally (i.e., substantially non-removable) with computing platform(s) 302 and/or removable storage that is removably connectable to computing platform(s) 302 via, for example, a port (e.g., a USB port, a firewire port, etc.) or a drive (e.g., a disk drive, etc.). Electronic storage 372 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 372 may include one or more virtual storage resources (e.g., cloud storage, a virtual private network, and/or other virtual storage resources). Electronic storage 372 may store software algorithms, information determined by processor(s) 374, information received from computing platform(s) 302, information received from remote platform(s) 304, and/or other information that enables computing platform(s) 302 to function as described herein.

Processor(s) 374 may be configured to provide information processing capabilities in computing platform(s) 302. As such, processor(s) 374 may include one or more of a digital processor, an analog processor, a digital circuit designed to process information, an analog circuit designed to process information, a state machine, and/or other mechanisms for electronically processing information. Although processor(s) 374 is shown in FIG. 3 as a single entity, this is for illustrative purposes only. In some implementations, processor(s) 374 may include a plurality of processing units. These processing units may be physically located within the same device, or processor(s) 374 may represent processing functionality of a plurality of devices operating in coordination. Processor(s) 374 may be configured to execute modules 310, 315, 320, 325, 330, 335, 340, 345, 350, 355, 360, 362, 365, 370 and/or 375, and/or other modules. Processor(s) 374 may be configured to execute modules 310, 315, 320, 325, 330, 335, 340, 345, 350, 355, 360, 362, 365, 370 and/or 375, and/or other modules by software; hardware; firmware; some combination of software, hardware, and/or firmware; and/or other mechanisms for configuring processing capabilities on processor(s) 374. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 310, 315, 320, 325, 330, 335, 340, 345, 350, 355, 360, 362, 365, 370 and/or 375 are illustrated in FIG. 3B as being implemented within a single processing unit, in implementations in which processor(s) 374 includes multiple processing units, one or more of modules 310, 315, 320, 325, 330, 335, 340, 345, 350, 355, 360, 362, 365, 370 and/or 375 may be implemented remotely from the other modules. The description of the functionality provided by the different modules 310, 315, 320, 325, 330, 335, 340, 345, 350, 355, 360, 362, 365, 370 and/or 375 described below is for illustrative purposes, and is not intended to be limiting, as any of modules 310, 315, 320, 325, 330, 335, 340, 345, 350, 355, 360, 362, 365, 370 and/or 375 may provide more or less functionality than is described. For example, one or more of modules 310, 315, 320, 325, 330, 335, 340, 345, 350, 355, 360, 362, 365, 370 and/or 375 may be eliminated, and some or all of its functionality may be provided by other ones of modules 310, 315, 320, 325, 330, 335, 340, 345, 350, 355, 360, 362, 365, 370 and/or 375. As another example, processor(s) 374 may be configured to execute one or more additional modules that may perform some or all of the functionality attributed below to one of modules 310, 315, 320, 325, 330, 335, 340, 345, 350, 355, 360, 362, 365, 370 and/or 375.

Figure 4D:
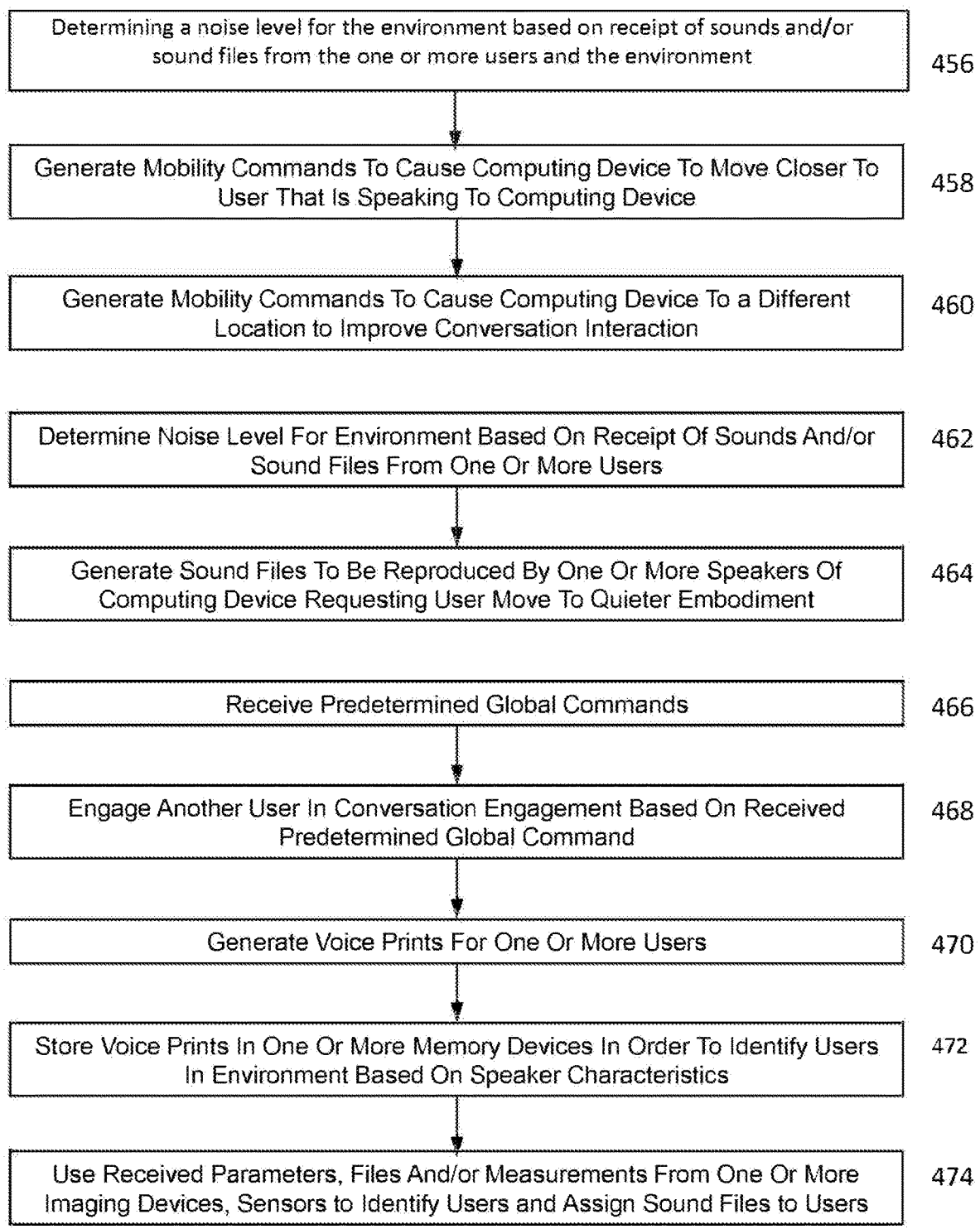
FIG. 4D illustrates a number of methods of enhancing communication interactions and engagement using multimodal beamforming and attention filtering system according to some implementations.

FIGS. 4A, 4B, 4C and 4D illustrate a method 400 for creating multimodal beamforming and attention filtering for multiparty interactions in accordance with one or more implementations. The operations of method 400 presented below are intended to be illustrative. In some implementations, method 400 may be accomplished with one or more additional operations not described, and/or without one or more of the operations discussed. Additionally, the order in which the operations of method 400 are illustrated in FIGS. 4A, 4B, 4C, and/or 4D and described below is not intended to be limiting.

In some implementations, method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

FIG. 4A illustrates a method of determining communication engagement in accordance with one or more implementations.

In some implementations, an operation 402 may include receiving parameters and measurements from at least two of one or more microphones (or a microphone array), one or more imaging devices, a radar sensor, a lidar sensor, one or more infrared imaging devices, and/or one of more 3D imaging devices located in a computing device including a conversation agent or system. In some implementations, the conversation agent or system may be gathering information about the environment utilizing multibeam input (e.g., the imaging devices, sensors, microphones). Operation 402 may be performed by one or more hardware processors configured by computer-readable instructions including a module that is the same as or similar to the multimodal input module 325, the audio input 310, the video input 315, the direction of arrival module 320 and/or the sensor module 325, in accordance with one or more implementations.

In some implementations, an operation 404 may include analyzing the parameters and measurements received from the multimodal input module and communicating the parameters and measurements to the multimodal beamforming module 340. In some implementations, operation 404 may be performed by one or more hardware processors configured by computer-readable instructions including a module that is the same as or similar to multimodal input module 325, in accordance with one or more implementations.

In some implementations, an operation 406 may include generating a world map (or a digital map) of the environment around the computing device that includes the conversation agent and/or system. In some implementations, the world map (or digital map) may include one or more users and objects that are located in the area around the conversation agent or system. Because so many inputs may be utilized (e.g., imaging devices, microphones, lidar, radar, direction of arrival measurements, thermal or infrared imaging devices, 3D imaging devices), the operation 406 may be able to form an accurate map of the environment. Operation 406 may be performed by one or more hardware processors configured by computer-readable instructions including a module that is the same as or similar to world tracking module 355 and multimodal beamforming module 340, in accordance with one or more implementations.

In some implementations, an operation 408 may include repeating the receiving of parameters and measurements from the input devices and the analyzing steps on a periodic basis in order to maintain a persistent world map of the environment. In some implementations, this may be every minute, every 5 minutes and/or every 10 minutes. In some implementations the timeframe in which the receiving of the parameters and measurements and the analyzing steps are repeated may be modifiable depending on the environment in which the computing device including the conversation agent is currently in. Operation 408 may be performed by one or more hardware processors configured by computer-readable instructions including a module that is the same as or similar to world tracking module 314, in accordance with one or more implementations.

In some implementations, the multimodal beamforming and attention filtering for multiparty interactions system or method may then analyze what user or users are engaging with the conversation agent or system in the computing device. In some implementations, an operation 410 may include identifying one or more users in the world map. In some implementations, operation 410 may include identifying, from the multibeam input or inputs, which located items are humans or users and/or which located items are objects. Operation 410 may be performed by one or more hardware processors configured by computer-readable instructions including a module that is the same as or similar to world tracking module 355, in accordance with one or more implementations.

In some implementations, an operation 412 may include tracking the engagement of the users utilizing the one or more multimodal input devices and the input received from the one or more multimodal input devices to determine the one or more users that are engaged with the computing device that includes the conversation agent. In some implementations, this may include interpreting eye gaze, gestures, proximity of user to conversation agent or system, movement of the user in order to determine engagement. This is also described in commonly owned U.S. provisional patent application entitled "Systems and Methods for Managing Conversation Interactions Between a User and A Robot Computing Device or Conversation Agent," application Ser. No. 62/983,590, filed Feb. 29, 2020. Operation 412 may be performed by one or more hardware processors configured by computer-readable instructions including a module that is the same as or similar to engagement module 360, in accordance with one or more implementations.

In some implementations, multimodal beamforming and attention filtering for multiparty interactions may utilize sound files or voice files for performing different actions. In some implementations, an operation 414 may include receiving one or more voice files from the one or more microphones. Operation 414 may be performed by one or more hardware processors configured by computer-readable instructions including a module that is the same as or similar to audio input module 310, in accordance with one or more implementations.

In some implementations, an operation 416 may include identifying a user in the world map who communicated the one or more voice files. Operation 416 may be performed by one or more hardware processors configured by computer-readable instructions including a module that is the same as or similar to audio input module 310 and/or multimodal input module 335, in accordance with one or more implementations.

In some implementations, the multimodal beamforming and attention filtering for multiparty interactions system and method may not communicate with users that are not engaged with the computing device that includes the conversation agent or system. In some implementations, an operation 418 may include not communicating with the user if the user is not engaged with the conversation agent or system. In some implementations, the world tracking module 355 may communicate which users are engaged to the multimodal beamforming module 340. In some implementations, the multimodal beamforming module may communicate with the multimodal output module 330 which users are to be communicated with and which users are not to be communicated with via the dialog management module 365. Operation 418 may be performed by one or more hardware processors configured by computer-readable instructions including a module that is the same as or similar to the multimodal output module 330, multimodal beamforming module 340 and/or dialog management module 365, in accordance with one or more implementations.

FIG. 4B illustrates a method of filtering sounds during communication interactions between a robot computing device and user(s), in accordance with one or more implementations.

In some implementations, an operation 420 may include retrieving a user's characteristics from one or more memory devices. In some implementations, the user's characteristics may include, but is not limited to, identify, history, priority status and/or whether or not the user is the primary user. Operation 420 may be performed by one or more hardware processors configured by computer-readable instructions including a module that is the same as or similar to the multimodal fusion module 345 and/or meta-information database 350, in accordance with one or more implementations.

In some implementations, an operation 422 may include comparing the user's characteristics to characteristics of the one or more users identified in the generated world map to identify targeted users among the one or more users. In some implementation, this may occur by the multimodal fusion module 345 retrieving the information associated with user characteristics from the meta-information database 350 and using the world map from the world tracking module 355. Operation 422 may be performed by one or more hardware processors configured by computer-readable instructions including a module that is the same as or similar to multimodal fusion module 345, meta-information database 350 and/or world tracking module 355, in accordance with one or more implementations.

In some implementations, an operation 424 may include receiving sound arrival direction measurements from the one or more users. This allows the computing device including the conversation agent to identify what direction the sound is coming from and thus know where the users are located. Operation 424 may be performed by one or more hardware processors configured by computer-readable instructions including a module that is the same as or similar to direction of arrival module 320 and audio input module 310, in accordance with one or more implementations.

In some implementation, the conversation agent or system may utilize the sound arrival direction measurements to assist in determining whether or not the user is engaged. In some implementations, an operation 426 may include filtering out sounds or sound files from any of the one or more users that are not engaged with the computing device that includes the conversation agent or system. Operation 426 may be performed by one or more hardware processors configured by computer-readable instructions including a module that is the same as or similar to multimodal fusion module 345 and/or multimodal beamforming module 340, in accordance with one or more implementations.

In some implementations, situations change and users may decide to no longer engage with the conversation agent or system. In some implementations, an operation 428 may include determining, after filtering out sounds or sound files of disengaged users, that one of the previously engaged users is no longer engaged with the computing device that includes the conversation agent or module. Operation 428 may be performed by one or more hardware processors configured by computer-readable instructions including a module that is the same as or similar to engagement module 360, multimodal fusion module 345, and/or world tracking module 355, in accordance with one or more implementations.

In some implementations, an operation 430 may include deactivating the filtering out of sounds or sound files of previously disengaged users to allow for processing of these sounds or sound files. In some implementations, this allows the conversation agent or system to reevaluate whether or not users have become engaged with the conversation agent or system. Operation 430 may be performed by one or more hardware processors configured by computer-readable instructions including a module that is the same as or similar to multimodal fusion module 345 and/or multimodal beamforming module 340, in accordance with one or more implementations.

In some implementations, rather than evaluating engagement of the users, the conversation agent or system may receive global commands that instruct the conversation agent to remove the filtering out of sounds of sound files from users that are identified in the received global command. In some implementations, an operation 432 may include deactivating the filtering out of the sounds or sound files of specified users based on receiving global commands. Operation 432 may be performed by one or more hardware processors configured by computer-readable instructions including a module that is the same as or similar to multimodal input module 335 and/or multimodal beamforming module 340, in accordance with one or more implementations.

In some implementations, a conversation agent or system may store sounds or sound files from all potential users, even if the users are not engaged. In some implementations, the conversation agent or system may then reanalyze these files to reevaluate whether or not these users should be listened to and thus processed. In some implementations, an operation 434 may include analyzing the sounds file of the non-engaged users to reassess if the sound or sound files of the non-engaged users should be processed based on the general context of the computing device. Operation 434 may be performed by one or more hardware processors configured by computer-readable instructions including a module that is the same as or similar to multimodal beamforming module 340, in accordance with one or more implementations.

FIG. 4C illustrates a method of assigning engagement levels in conversation interactions, according to some implementations. In some implementations, the multimodal beamforming and attention filtering system may also include functionality to assign sounds or sound files to users. In some implementations, the conversation agent or system may utilize sound or audio files and/or video files to complete the evaluation. An operation 436 may include receiving one or more sound files from the one or more microphones. Operation 436 may be performed by one or more hardware processors configured by computer-readable instructions including a module that is the same as or similar to audio input module 310 and/or multimodal input module 335, in accordance with one or more implementations.

In some implementations, an operation 438 may include receiving images files from the one or more imaging devices. Operation 438 may be performed by one or more hardware processors configured by computer-readable instructions including a module that is the same as or similar to video input module 315 and/or multimodal input module 335, in accordance with one or more implementations.

In some implementations, an operation 440 may include analyzing the image files from the one or more imaging devices to identify users that are speaking. Operation 440 may be performed by one or more hardware processors configured by computer-readable instructions including a module that is the same as or similar to multimodal input module 335 and/or multimodal beamforming module 340, in accordance with one or more implementations.

In some implementations, an operation 442 may include assigning the one or more sound files to the one or more users that are identified as the speaking users. Operation 442 may be performed by one or more hardware processors configured by computer-readable instructions including a module that is the same as or similar to multimodal beamforming module 340, in accordance with one or more implementations.

Another important feature of the multimodal beamforming and attention filtering system is its ability to prioritize users based on specific characteristics (e.g., engagement level). In some implementations, an operation 444 may include determining an engagement level of the one or more users with respect to the conversation agent or module. Operation 444 may be performed by one or more hardware processors configured by computer-readable instructions including a module that is the same as or similar to engagement module 360, in accordance with one or more implementations.

In some implementations, an operation 446 may include assigning a priority level value for each of the users based on the engagement level determined in operation 444. In some implementations, the computing device including the conversation agent or system may generate a priority queue for the users and the conversation agent or system will respond or engage in a conversation interaction with the users in accordance with the priority queue. In some implementations, the engagement level may be determined by utilizing facial recognition, voice identification, proximity to computing device, gesture evaluation, and/or facial expression evaluation. Operation 446 may be performed by one or more hardware processors configured by computer-readable instructions including a module that is the same as or similar to the world tracking module 355 and/or multimodal beamforming module 340, in accordance with one or more implementations.

In some implementations, the conversation agent or system may analyze received video or image files to determine which users should be engaged (or listened to). In some implementations, an operation 448 may include identifying one or more users in the world map. Operation 448 may be performed by one or more hardware processors configured by computer-readable instructions including a module that is the same as or similar to world tracking module 355, in accordance with one or more implementations.

In some implementations, an operation 450 may include determining which of the one or more users to listen to or process sounds or sound files from based on analysis of the images or image files captured with respect to the one or more users. In some implementations, the analysis of the image or video files may include analyzing a user's face, a user's eye gaze, a user's gestures, a user's speech, and/or movement or motion in the environment around the user. In some implementations, operation 450 may be performed by one or more hardware processors configured by computer-readable instructions including a module that is the same as or similar to video input module 315, multimodal input module 335, and/or multimodal fusion module 345, in accordance with one or more implementations.

In some implementations, the environment around the computing device including the conversation agent or module may be very noisy. In some implementations, the multimodal beamforming and attention filtering system include a number of features (including lip reading of image files) to assist in increasing the accuracy of speech recognition by the conversation agent or system. In some implementations, an operation 452 may include identifying one or more users in the world map. Operation 452 may be performed by one or more hardware processors configured by computer-readable instructions including a module that is the same as or similar to world tracking module 355 and/or multimodal beamforming module 340, in accordance with one or more implementations. Although arrows are drawn between steps or operations 446 and 448 as well as between 450 and 452, this does not necessarily mean these operations occur in this order and/or sequentially.

In some implementations, an operation 454 may include analyzing mouth shape and/or lip movement of received images for the one or more users to improve speech recognition accuracy. Operation 454 may be performed by one or more hardware processors configured by computer-readable instructions including a module that is the same as or similar to world tracking module 355 and/or multimodal beamforming module 340, in accordance with one or more implementations.

FIG. 4D illustrates a number of methods of enhancing communication interactions and engagement using multimodal beamforming and attention filtering system according to some implementations.

The multimodal beamforming and attention filtering system may also include other features to try to move away from the noisy environment or have the user move away from the noisy environment. In some implementations, an operation 456 may include determining a noise level for the environment based on receipt of sounds and/or sound files from the one or more users and the environment. Operation 456 may be performed by one or more hardware processors configured by computer-readable instructions including a module that is the same as or similar to multimodal output module 330, in accordance with one or more implementations.

In some implementations, an operation 458 may include generating mobility commands to cause the computing device to move closer to or face a user that is speaking to the computing device. Operation 458 may be performed by one or more hardware processors configured by computer-readable instructions including a module that is the same as or similar to multimodal beamforming module 340, multimodal output module 330 and/or motor movement 375, in accordance with one or more implementations.

In some implementations, an operation 460 may include generating mobility commands to cause the computing device that includes the conversation agent or system to move to a different location in order to improve the conversation agent's view of the user(s), hearing of the speech of user and/or overall experience with the user. In some implementations, this may mean instructing the computing device including the conversation agent to move to a corner of the room, to a less crowded area of the room or space and/or an opening in the room or space. Operation 460 may be performed by one or more hardware processors configured by computer-readable instructions including a module that is the same as or similar to multimodal beamforming module 340, multimodal output module 330 and/or motor movement 375, in accordance with one or more implementations.

In some implementations, the conversation agent or system may request that the user perform some action to improve the user experience. In some implementations, an operation 462 may include determining a noise level for the environment based on receipt of sounds and/or sound files from the one or more users, as well as an overall noise level of the room or open space. Operation 462 may be performed by one or more hardware processors configured by computer-readable instructions including a module that is the same as or similar to noise level determination module 354, in accordance with one or more implementations.

In some implementations, an operation 464 may include generating sound files to be reproduced by one or more speakers of the computing device requesting the user move to a quieter embodiment. Operation 464 may be performed by one or more hardware processors configured by computer-readable instructions including a module that is the same as or similar to multimodal output module 330 and/or active noise reduction module 370, in accordance with one or more implementations.

In some implementations, the multimodal beamforming and attention filtering system also may respond to global commands that may override any decision the conversation agent or system is currently making. In some implementations, an operation 466 may include receiving predetermined global commands. The predetermined global commands may instruct the conversation agent located in a computing device to change engagement focus to another user. Operation 466 may be performed by one or more hardware processors configured by computer-readable instructions including a module that is the same as or similar to the multimodal beamforming module 340, the multimodal input module 335 and/or the audio input module 310, in accordance with one or more implementations.

In some implementations, an operation 468 may include engaging another user in a conversation engagement based on the received predetermined global command. In some implementations, operation 468 may be performed by one or more hardware processors configured by computer-readable instructions including a module that is the same as or similar to multimodal beamforming module 340, in accordance with one or more implementations. Although an arrow is drawn between steps or operations 468 and 470, this does not necessarily mean these operations occur in this order and/or sequentially.

In some implementations, the multimodal beamforming and attention filtering system may utilize prior recorded user voices to identify who is speaking in an environment. In some implementations, an operation 470 may include generating voice prints for the one or more users. Operation 470 may be performed by one or more hardware processors configured by computer-readable instructions including a module that is the same as or similar to audio input module 310, multimodal input module 335, multimodal fusion module 345 and/or meta-information database 350, in accordance with one or more implementations.

In some implementations, an operation 472 may include storing the voice prints in one or more memory devices in order to use them later to identify users in the environment based on speaker characteristics. The speaker characteristics may include, but not limited to, spectral characteristics and prosody. In other words, the conversation agent or system may receive new voice files and then compares the received voice files to the stored voice prints to identify users in the environment. This may be helpful if multiple children from one family are in a room and are talking. The conversation agent can identify the family member who normally interacts with the conversation agent by the voice print. Operation 472 may be performed by one or more hardware processors configured by computer-readable instructions including a module that is the same as or similar to multimodal fusion module and/or multimodal beamforming module, in accordance with one or more implementations.

In addition, other inputs may be utilized in identifying which users are speaking in an environment. In some implementations, an operation 474 may include further including using the received parameters, files and/or measurements from the one or more imaging devices, one or more radar sensors, one or more lidar sensors to determine which users are speaking and to assign the sound or sound files to a correct user. Operation 474 may be performed by one or more hardware processors configured by computer-readable instructions including a module that is the same as or similar to parameter using multimodal input module 335, multimodal fusion module 345 and/or world tracking module 355, in accordance with one or more implementations.

Figure 5A:
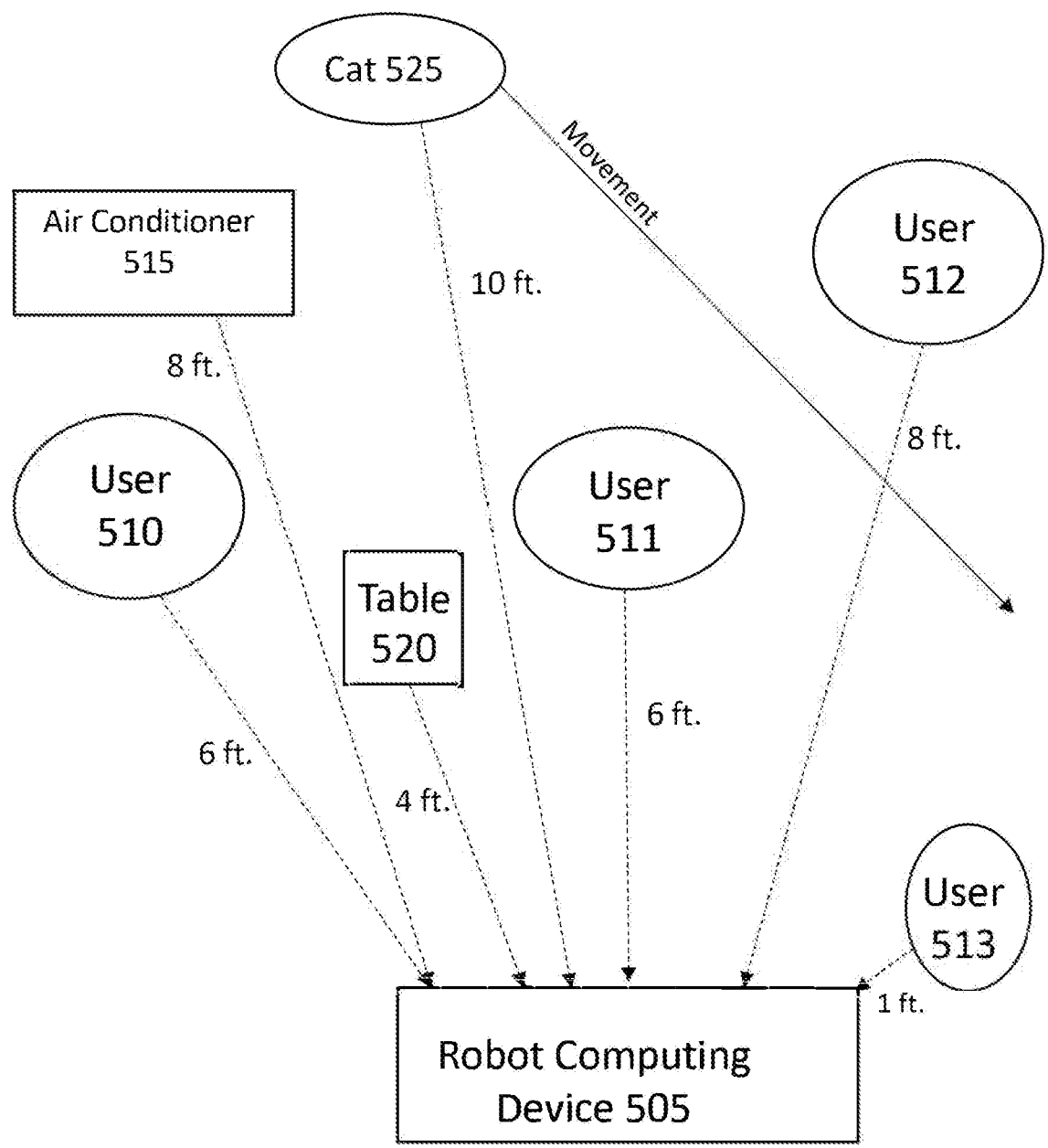
FIG. 5A illustrates an environment including multiple users, one or more objects, a moving living organism and/or a robot computing device according to some embodiments.

FIG. 5A illustrates an environment including multiple users, one or more objects, a moving living organism and/or a robot computing device according to some embodiments. In some embodiments, the robot computing device 505 may have a multimodal beam forming and attention filtering system to monitor and/or communicate with one or more users 510, 511, 512 or 513, a table 520, an air conditioner 515, and/or a living organism (e.g., cat) 525. In some embodiments, the robot computing device 505 may scan and/or monitor the different items in the surrounding environment. In some embodiments, an audio input module 310, a video or image input module 315, a direction of arrival module and/or a sensor module 320 may monitor the environment. For example, in the embodiment illustrated in FIG. 5A, one or more microphones located in the audio input module may capture sounds made from a number of users (e.g., users 510, 512, and 513 may be making sounds or speaking), sounds made by the cat 525 (e.g., a meowing or hissing sound), and/or sounds made by an air conditioner 515. In this embodiment, the captured sounds may be communicated from the audio input module 310 to the multimodal input module 335. In some embodiments, the video input module 315 may include one or more imaging devices, one or more cameras, one or more three-dimensional (3D) imaging devices, one or more thermal imaging devices, and/or one or more infrared imaging devices. In the embodiment illustrated in FIG. 5A, the one or more imaging devices of the video input module 315 may capture images or videos that include users 510, 511, 512 and/or 513, a video or image of a table 520, a video or image of at least a portion of an air conditioner 515 (part of the image or the video of the air conditioner may be blocked), and/or a part of an image or video of a cat 525 (which also may be moving). In some embodiments, the images may be 3-D images. In some embodiments, the video input module 315 may communicate the captured images or videos to the multimodal input module 335. In some embodiments, the sensor input module 525 may include one or more LIDAR sensors, one more radar sensors, one or more proximity sensors, one or more infrared sensors, or other object detection sensors that capture presence and/or locations of objects in the environment. In the embodiment illustrated in FIG. 5A, the sensor input module 525 may capture presence and/or location parameters of the users 510, 511, 512 and 513, the table 520, the air conditioner 515 and/or the cat 525. In some embodiments, the sensor input module 525 may communicate the presence and location parameters to the multimodal input module 335. In some embodiments, the sound and/or voice files, the images or video files, and/or the presence and location parameters may also be communicated to a direction of arrival module 320, which may determine a direction from which the different files have been received. In this embodiment, the direction of arrival module 320 may analyze the received sound and voice files and may determine that 1) the sound or voice from user 513 is coming from a right side direction, 2) the sound files coming from the cat 525 are far away, moving closer and/or going from left to right; 3) the sound and voice files coming from user 511 are coming from directly in front of the robot computing device 505; 4) the sound and voice files are coming from user 510 are coming from the left side; and 5) the sound files from the air conditioner 515 are coming from the left side. In this embodiment, the directional of arrival module 320 may communicate the location and/or directional parameters or measurements to the multimodal input module 335. In some embodiments, the video or images from the video input module 315 may also be utilized by the directional of arrival module 320 to assist in determining location and/or directional parameters or measurements. In some embodiments, the sensor module 325 may also be utilized by the directional of arrival module 320 to assist in determining location and/or directional parameters or measurements.

In some embodiments, the multimodal input module 335 may communicate the received audio or sound files, the video or image files, the direction of arrival parameters or measurements, the lidar sensor parameters or measurements, the radar sensor parameters or measurements, the proximity sensor parameters or measurements, the thermal or infrared cameras files and/or measurements, the 3D images to the multimodal fusion module 345 and/or the world tracking module 355. In some implementations, the world tracking module 355 may generate the world map that identifies users and/or objects in the environment around the computing device that include the multimodal beamforming system. In other words, the multimodal beamforming module 340 analyzes the video files, direction of arrival sound parameters or measurements, the sensor (lidar, radar, proximity) parameters and/or measurements, and/or sound or voice files in order to generate the world map. In the example described above, the world tracking module 355 may generate a world map of the environment around robot computing device 505. More specifically, as is illustrated in FIG. 5A, the generated or created world map may include 1) a user 510 that is speaking located six feet from the robot computing device 505 and located to the left side of the robot computing device 505; 2) a non-speaking non-living table 520 that is located approximately 4 feet away and slighting to the left of the robot computing device 505, 3) a non-speaking user 511 located approximately 6 feet from and directly in front of the robot computing device 505; 4) an air conditioner device 515 that makes an operating noise and is located approximately 8 feet away and to the left of the robot computing device 505; 5) a noise-making and moving cat 525 that was located originally in front of the robot computing device and ten feet away but is moving closer to the robot computing device and to the right; 6) a speaking user 512 located 8 feet away from the robot computing device and slightly to the right; and 7) a speaking user 513 located 1 foot away from the robot computing device and approximately 45 degrees to the right. As discussed previously, the creation of the world map by the world tracking or map module 355 may take place on a continuous basis while the robot computing device is operating (e.g., every 5 minutes, every minute, every 30 minutes or every hour, although these are just representative examples) and the world map may be refreshed at any defined time rate.

In some embodiments, the robot computing device 505 may determine which of the users are engaged with the robot computing device. In some embodiments, the engagement module 360 may utilize the images or video files, sound or noise files, movements of users and/or proximity or location measurements and/or parameters received from the multimodal fusion module 345 to determine engagement of the user. Utilizing the example illustrated in FIG. 5A, user 510 may be staring at and/or pointing at the robot computing device and the engagement module 360 may identify that user 510 is engaged with the robot computing device. User 511 may be staring away from the robot computing device and trying to pet the cat and the engagement module may analyze these images and gestures and determine that user 511 is not engaged with the robot computing device 505. User 512 may be looking towards the robot computing device, may be 8 feet away and may be moving sideways away from the robot computing device. The engagement module may analyze these images, proximity readings (e.g., 8 feet and moving away) and determine that the user 511 is not engaged with the robot computing device (even though user 511 is looking at the robot computing device). User 513 may be one foot away from the robot computing device, trying to touch the robot computing device and looking directly in the robot computing device's eyes. The engagement module 360 may analyze the touching gesture and/or sensor input, that the user is close in proximity, and that the user has a very strong eye gaze, and determine that the user is very engaged with the robot computing device 505.

In some embodiments, the robot computing device may then receive voice input files at the one or more microphones in the audio input module 310 and the direction of arrival module 320 may also provide directional measurements or parameters that the voice files came from. In this embodiment, the voice input files and the direction of arrival parameters of measurements may then be utilized by the multimodal beamforming module 340 (and the world tracking module 355) to determine which users are speaking, and then communicate with those users. In some embodiments, the multimodal beamforming module 340 may also identify which users not to communicate with. The multimodal beamforming module may communicate which users are to be communicated with, and also which users are not being communicated with to the multimodal output module 330 and/or the dialog management module 365. In the example illustrated in FIG. 5A, voice files may be received from users 510, 512 and 513 and the multimodal beamforming module may be able to identify which voice files below to which users. Because user 512 was determined not to be engaged, the multimodal beamforming module 340 may communicate with the multimodal output module 330 that the dialog management module 365 should only communicate with users 510 and 513 (because they showed signs of engagement) and should not communicate with user 512. In some embodiments, the multimodal beamforming module 340 and/or multimodal fusion module 345 may also utilize the direction of arrival measurements to filter out sound from the users that have been identified as not engaged with the robot computing device. In some embodiments, the active noise reduction module 370 may utilize the measurements and/or parameters or files from the multimodal beamforming module 340 to filter out specifically designed files. In the example illustrated in FIG. 5A, the multimodal beamforming module 340 and/or multimodal fusion module 345 may filter out sounds from users 511 and/or 512 (who are not engaged). In the example illustrated in FIG. 5A, the multimodal beamforming module 340 and/or the active noise reduction module may also filter out noises from other non-humans (e.g., a cat 525) and/or an air conditioner 515 based knowing where the sounds are coming from and/or the characteristics of the sounds. In some embodiments, the active noise reduction module 370 and/or multimodal beamforming module 340 may also filter out these non-human noises by reducing or cancelling the sounds and/or characteristics of these sounds and/or noises.

Another unique feature or function of the robot computing device is the ability to continue to monitor engagement levels of users, and if the engagement module 360 determines that one of the previously engaged users becomes disengaged, the engagement module 360 communications with the multimodal beamforming module 340 and/or world tracking module 355 to identify which user is disengaged. In this embodiment, the multimodal beamforming module 340 communicates to the multimodal output module 330, the dialog management module 365, and/or the active noise reduction module 370 to filter out the speech identified as coming from the newly disengaged user. In the example illustrated in FIG. 5A, the engagement module 360 determines that previously engaged user 513 is now looking away and moving away from the robot computing device 505. Based on the eye gaze and mobility of user 513, the engagement module identifies that user 513 is now disengaged. The engagement module 360 communicates this to the multimodal beamforming module 340 which communicates this to the multimodal output module 330 to instruct the dialog management module 365 to filter out communication or voice files from the user 513.

In addition, the robot computing device and/or the multimodal beamforming module 340 may continue to monitor whether or not users are engaged with the robot computing device in order to determine whether or not to reengage with these users and process the sound and/or voice files from the newly reengaged users. In the example illustrated in FIG. 5A, the engagement module 360 may continue to monitor the engagement of the prior non-engaged users 511 and 512 based on the received video or image files, sound input or files, and/or gesture images or files. In this embodiment, the engagement module 360 may identify that the user 511 is moving towards the robot computing device 505 and speaking in a loud and friendly voice, and thus determine that user 511 is reengaging with the robot computing device 505. In this embodiment, the engagement module 360 may communicate this reengagement information so that the dialog management module 365 begins processing the sound files associated with the newly engaged user 511.

In addition, the robot computing device may respond to global commands that instruct the conversation agent and/or module to stop filtering voice files from specific users. In some embodiments, a user or operator may state "hold on Moxie, no filtering of voices" or a similar command, and the multimodal beamforming module 340 and/or multimodal output module 330 may instruct the dialog management module 365 (and/or potentially the active noise reduction module 370) to stop filtering of sound files from any of the human users. In some embodiments, the multimodal beamforming system 340 may also override other instructions and respond to global commands on which user to focus on regardless of any determination of how engaged the users are. In some embodiments, one of the global commands may be "begin talking." For example, utilizing the embodiment illustrated in FIG. 5A, a parent or guardian may state "begin talking to user 513" although user 513 may not be engaged with the robot computing device. This flexibility allows many different methods of determining which users to engage with.

In some embodiments, the robot computing device and/or the multimodal beamforming module 340 may also prioritize users and specifically engage users based on a number of factors. In these embodiments, the robot computing device may determine an engagement level parameter or value for each user by utilizing facial recognition analysis, voice identification analysis utilizing direction of arrival estimates and/or voice matching, proximity measurements with respect to a computing device and/or gesture analysis. In these embodiments, the multimodal beam transforming module 340, the word tracking module 355 and/or the engagement module 360 may work to establish an engagement level value or measurement. After the engagement level parameter or value is determined, the multimodal beam transforming module 340 and/or the multimodal output module 330 may communicate the engagement level values or measurements to the dialog management module 365 to establish a priority queue for engaged users. In the example illustrated in FIG. 5A, the engagement module and/or the multimodal beam transforming module may have determined that users 510 and 513 are engaged. User 510 may be moving slightly closer to the robot computing device and also closer to directly in front of the robot computing device 505. In addition, user 510 may have their arms outstretched and with open palms indicating they are receptive to interact with the robot and may also have their eyes wide open. In this example, the engagement module 360 and/or the multimodal beam transforming module 340 may assign a high engagement level parameter or value to user 510 and/or also a high priority level. User 513 may be located 3 feet closer to the robot, may occasionally be glancing at the robot, may be stationary and may have a frown on his or her face. Although user 513 is closer to the robot computing device than user 510, the facial recognition analysis and the proximity analysis may cause the calculation of a lower engagement level measurement or value for user 513 because user 513 is not fully engaged (he or she is only glancing at the robot) and does not appear to be happy with the current interaction). Based at least in part on this analysis, the engagement module 360 and/or the multimodal beam transforming module 340 may assign a medium engagement level or measurement to user 513 and/or also a medium priority level. The priority level values or measurements for users 513 and 510 may be communicated to the dialog manager module 365 and the dialog management module 355 may focus communication interactions with user 510 first followed by communication interactions with user 513.

In some embodiments, the robot computing device and/or multimodal beamforming module 340 may rely on image analysis to determine a user to talk to. In this embodiment, the images and/or videos may be received from the video input module 315 and the multimodal input module 335. In this embodiment, the multimodal fusion module 345 and/or the multimodal beamforming module 340 may analyze the images (e.g., analyze the face, the user's eye gaze, the user's gestures, the user's speech, movement of the user and/or movement of the arms) to determine which user or users that the robot computing device should have a conversation with. After this determination is made, the multimodal beamforming module 340 may communicate with multimodal output module to instruct the dialog manager module 365 as to which users to communicate with. In the example illustrated in FIG. 5A, images and/or videos of users 511 and 512 may be captured by the cameras and/or imaging devices, may be processed as described above and may be communicated to the multimodal fusion module 345 and the multimodal beamforming module 340 for imaging analysis. The multimodal fusion module 345 and/or the multimodal beamforming module 340 may analyze video or images of user 511 and determine the user has weak eye gaze (e.g., he or she is looking down), is waving his or her arms in a manner that suggests he wants to hide (e.g., the arms are crossed in front of his or her face) and is leaning backwards away from the robot computing device. Based on this analysis, multimodal fusion module 345 and/or the multimodal beamforming module 340 may determine that this user should not be communicated with at the present time. The multimodal fusion module 345 and/or the multimodal beamforming module 340 may analyze the images of user 512 and see that the user 512 occasionally looks away from the robot computing device, is clapping his or her hands, has a smile and is leaning forward towards the robot computing device. Based on this analysis, multimodal fusion module 345 and the multimodal beamforming module 340 may determine that user 512 shoud be communicated with. In these embodiments, the multimodal beamforming module 340 may communicate with the multimodal output module 330 to instruct the dialog manager module 365 to communicate with user 512.

In some embodiments, the user may be located in a noisy environmet so the user's speech may not be heard well or at all. In these embodiments, the robot computing device may have the ability to process images, and/or analyze the mouth shape and movements and/or lip movements of the users to improve speech recognition accuracy (lip reading analysis may also be utilized). Accordingly, the multimodal beamforming module 340 and/or the multimodal fusion module 345 may analyze the images related to the users lip movements and/or mouth movements to enhance the speech recognition analysis.

The robot computing device 505 and/or the multimodal beamforming module 340 has additional novel and unique techniques for dealing with noise in the environment around the robot computing device. In some embodiments, the one or more microphones of the audio input module 310 may receive the sound or voice files from the users, devices and objects in the environment. In these embodiments, these voice and/or sound files may be communicated to the multimodal beamforming module 340 and/or the multimodal fusion module 345 which may determine that the present environment is too noisy for the robot computing device to hear the user. In these embodiments, the multimodal beamforming module 340 may communicate commands to the multimodal output device 330 and/or the motor movement module 375 to cause the robot computing device to move closer to a user that is speaking. In response, the robot computing device may move closer to the speaking user. In some embodiments, the multimodal beamforming module 340 may also communicate with the active noise reduction module 370 to reduce noise during processing of the voice and/or sound files. In the example illustrated in FIG. 5A, user 510 may be speaking to the robot computing device, but the air conditioner and/or the cat may be making too much noise. In these embodiments, the multimodal beamforming module 340 may communicate to the motor movement module 375 to move the robot computing device 505 forward and/or to the left in order to move the robot computing device closer to user 510. This movement improves the communication capabilities between the robot computing device and the user 510. In some embodiments, the mobility commands communicated to the motor movement module 375 may cause the robot computing device to move to a location with a better view of the user, wherein they can hear the user better and/or engage in a better experience with the user.

In some embodiments, if there is a noisy embodiment around the user, the robot computing device and/or the multimodal beamforming module 340 may communicate with the user to move to a different location in order to decrease the noise in the environment. In these embodiments, the noise information and/or parameters (from the sound files and/or voice files) regarding the environment may be communicated to the multimodal beamforming module 340 and/or the multimodal fusion module 345, which may determine that the present environment is too noisy for the robot computing device to hear the user. In these embodiments, the multimodal beamforming module 340 may communicate commands to the multimodal output device 330 and/or the dialog management module 365 and/or the speakers of the robot computing device to cause the robot computing device to request that the user to move closer to the robot computing device in order to reduce or eliminate the noise. In some embodiments, the multimodal beamforming module 340 may also communicate with the active noise reduction module 370 to process the sound or voice files to reduce noise elements of these sound and/or voice files. In the example illustrated in FIG. 5A, user 510 may be speaking to the robot computing device 505, but the air conditioner and/or the cat may be making too much noise. In these embodiments, the multimodal beamforming module 340 may communicate to the dialog management module 365 that voice files should be communicated to the one or more speakers to request that the user move forward (e.g., closer and/or more directly in front of the robot computing device 505 in order to reduce or eliminate the noise. In some embodiments, the voice files may also request that the user move to a quieter environment and then the robot computing device may also move to the quieter environment to better interact with the user. In the example illustrated in FIG. 5A, user 510 may be requested to move to the area where user 513 is located because in this example, user 513 is not talking. In addition, the multimodal beamforming module 340 may communicate with the motor movement module 375 to have the robot computing device to turn its head and/or body to the right (which is the area that the user 510 has moved to).

In some embodiments, the robot computing device 510 and/or the multimodal beamforming module 340 may also utilize voice prints of users in order to identify a primary user of the robot computing device. In some embodiments, each member of a family may record a voice print during initialization of the robot computing device or at any time when interacting with the robot computing device. In some embodiments, each user may: 1) speak a phrase; 2) the one or microphones of the audio input module 310 may receive the captured voice print audio file; 3) the audio input module 310 may communicate the captured voice print audio file to the multimodal input module 335, which in turn communicates the captured voice print to the multimodal beamforming module 340. In some embodiments, the multimodal beamforming module 340 may store the captured voice print audio file (which may be the primary user's audio file) in the data storage 362 and/or the meta-information database 350. In some embodiments, as is illustrated in FIG. 5A, there may be multiple users 510, 511, 512 and 513, and each of them may be speaking at the same time. In these embodiments, the audio input module may capture sound or audio files for all of the users because they are speaking and these captured audio files may be communicated to the multimodal input module 335, where direction of arrival measurements and/or parameters may also be received. In some embodiments, the multimodal input module 335 may communicate the captured voice and audio files and corresponding direction of arrival measurements and/or parameters to the multimodal beamforming module 340. As discussed above, the direction of arrival measurements and/or parameters may allow the multimodal beamforming module 340 (and the world tracking module 355) to identify the location of each user 510, 511, 512 and 513. In these embodiments, in order to determine which voice or audio files correspond to the primary user, the multimodal beamforming module 340 may compare each of received audio or voice files to the voice prints stored in the meta-information database 350 and/or the data storage 362 in order to determine which of the captured audio or voice files corresponds to the primary user. Once this is determined, the multimodal beamforming module 340 may instruct the dialog management module 365 to communicate with the primary user only. In the example illustrated in FIG. 5A, the voice or audio files from user 512 may match the primary user's stored voice print in the data storage 362 and/or meta-information database 350 and thus the robot computing device may communicate with user 512 (even though it is the farthest away).

Although not shown in the flowcharts, the robot computing device may have two modes. The first mode is a mode where the single user is alone in a conversation interaction with the robot computing device. The second mode is a mode where multiple users are engaged in conversation interactions with the conversation agent, module and/or engine with the robot computing device.

As detailed above, the computing devices and systems described and/or illustrated herein broadly represent any type or form of computing device or system capable of executing computer-readable instructions, such as those contained within the modules described herein. In their most basic configuration, these computing device(s) may each comprise at least one memory device and at least one physical processor.

The term "memory" or "memory device," as used herein, generally represents any type or form of volatile or non-volatile storage device or medium capable of storing data and/or computer-readable instructions. In one example, a memory device may store, load, and/or maintain one or more of the modules described herein. Examples of memory devices comprise, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In addition, the term "processor" or "physical processor," as used herein, generally refers to any type or form of hardware-implemented processing unit capable of interpreting and/or executing computer-readable instructions. In one example, a physical processor may access and/or modify one or more modules stored in the above-described memory device. Examples of physical processors comprise, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the method steps described and/or illustrated herein may represent portions of a single application. In addition, in some embodiments one or more of these steps may represent or correspond to one or more software applications or programs that, when executed by a computing device, may cause the computing device to perform one or more tasks, such as the method step.

In addition, one or more of the devices described herein may transform data, physical devices, and/or representations of physical devices from one form to another. For example, one or more of the devices recited herein may receive image data of a sample to be transformed, transform the image data, output a result of the transformation to determine a 3D process, use the result of the transformation to perform the 3D process, and store the result of the transformation to produce an output image of the sample. Additionally, or alternatively, one or more of the modules recited herein may transform a processor, volatile memory, non-volatile memory, and/or any other portion of a physical computing device from one form of computing device to another form of computing device by executing on the computing device, storing data on the computing device, and/or otherwise interacting with the computing device.

The term "computer-readable medium," as used herein, generally refers to any form of device, carrier, or medium capable of storing or carrying computer-readable instructions. Examples of computer-readable media comprise, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

A person of ordinary skill in the art will recognize that any process or method disclosed herein can be modified in many ways. The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed.

The various exemplary methods described and/or illustrated herein may also omit one or more of the steps described or illustrated herein or comprise additional steps in addition to those disclosed. Further, a step of any method as disclosed herein can be combined with any one or more steps of any other method as disclosed herein.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and shall have the same meaning as the word "comprising.

The processor as disclosed herein can be configured with instructions to perform any one or more steps of any method as disclosed herein.

As used herein, the term "or" is used inclusively to refer items in the alternative and in combination. As used herein, characters such as numerals refer to like elements.

Embodiments of the present disclosure have been shown and described as set forth herein and are provided by way of example only. One of ordinary skill in the art will recognize numerous adaptations, changes, variations and substitutions without departing from the scope of the present disclosure. Several alternatives and combinations of the embodiments disclosed herein may be utilized without departing from the scope of the present disclosure and the inventions disclosed herein. Therefore, the scope of the presently disclosed inventions shall be defined solely by the scope of the appended claims and the equivalents thereof.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A method of creating a view of an environment, comprising:
   accessing computer-readable instructions from one or more memory devices for
   execution by one or more processors of a computing device;
   executing the computer-readable instructions accessed from the one or more memory devices by the one or more processors of the computing device; and
   wherein executing the computer-readable instructions further comprising:
   receiving, at the computing device, voice files, visual effect files, facial expression files and/or mobility files;
   receiving parameters and measurements from at least two of one or more microphones, one or more imaging devices, a radar sensor, a lidar sensor and/or one or more infrared imaging devices located in the computing device;
   analyzing the parameters and measurements received from the multimodal input; generating a world map of the environment around the computing device, the world map including two or more users and objects;
   repeating the receiving of parameters and measurements from the input devices and the analyzing steps on a periodic basis to maintain a persistent world map of the environment;
   tracking the engagement of the two or more users utilizing the received parameters and measurements to determine the one or more users that are engaged with the computing device;
   determining a noise level for the environment based on receipt of sounds and/or sound files from the two or more users and the environment; and
   generating mobility commands to cause the computing device to move closer to a user that is speaking to the computing device if the environment is too noisy to hear the user that is speaking.

2. The method of claim 1, wherein executing the computer-readable instructions further comprising:
   receiving one or more voice files from the one or more microphones; and
   identifying a user in the world map who communicated the one or more voice files; and not communicating with the user if the user is determined to not be engaged with the computing device.

3. The method of claim 1, wherein executing the computer-readable instructions further comprising:
   retrieving user's characteristics from the one or more memory devices; and
   comparing the user's characteristics to characteristics of the two or more users in the persistent world map to identify targeted users among the one or more users.

4. The method of claim 3, wherein the user's characteristics comprise a user's name or identity, a user's history, a user's physical characteristics or a user's priority status.

5. The method of claim 1, wherein executing the computer-readable instructions further comprising:
   receiving sound arrival direction measurements from the two or more users; and
   filtering out sounds or sound files from any of the two or more users that are not engaged with the computing device.

6. The method of claim 5, wherein executing the computer-readable instructions further comprising:
   determining, after filtering out sounds or sound files, that one of the previously engaged users is no longer engaged with the computing device; and
   turning off the filtering out of sounds or sound files to allow processing of these sounds or sound files.

7. The method of claim 1, wherein executing the computer-readable instructions further comprising:
   filtering out sounds or sound files from animals.

8. The method of claim 5, wherein the receipt of one or more global commands may allow the computing device to filter out sound files from one of the engaged users.

9. The method of claim 5, wherein executing the computer-readable instructions further comprising:
   deactivating the filtering out of the sounds or sound files of the non-engaged users; and
   analyzing the sound file of the non-engaged users to reassess if the sound or sound files of the non-engaged users should be processed based on general context of the computing device.

10. The method of claim 1, wherein executing the computer-readable instructions further comprising:
    receiving one or more sound files from the one or more microphones; receiving images files from the one or more imaging devices;
    analyzing the image files from the one or more imaging devices to identify users of the one or more users that are speaking; and
    assigning the one or more sound files to the users that are identified as the speaking users.

11. The method of claim 1, wherein executing the computer-readable instructions further comprising:
    determining an engagement level of the two or more users; and
    assigning a priority queue for the computing device to respond or engage in a conversation interaction to the two or more users based on the engagement level, wherein the engagement level is determined based on facial recognition, voice identification, proximity to computing device, gestures and/or facial expressions.

12. The method of claim 11, wherein the engagement level is determined based on facial recognition, voice identification, proximity to computing device, gestures and/or facial expressions.

13. The method of claim 1, wherein executing the computer-readable instructions further comprising:
identifying one or more users in the world map; and
determining which of the one or more users to listen to or process sounds or sound files from, based at least in part on analysis of the images or image files captured with respect to the one or more users.

14. The method of claim 13, wherein the analysis of the files includes analyzing a user's face, a user's eye gaze, a user's gestures, a user's speech, an LED light and/or movement or motion in the environment around the user.

15. The method of claim 1, wherein executing the computer-readable instructions further comprising:
receiving predetermined global commands, the predetermined global commands instructing the computing device to change engagement focus to another user; and
engaging the another user in a conversation engagement based on the received predetermined global command.

16. A method of claim 1, wherein executing the computer-readable instructions further comprising:
generating voice prints for the two or more users; and
storing the voice prints in one or more memory devices in order to identify users in the environment based on speaker characteristics, the speaker characteristics including, but not limited to, spectral characteristics and prosody.

17. The method of claim 16, wherein executing the computer-readable instructions further comprising: using the received parameters, files and/or measurements from the one or more imaging devices, the radar sensor, the lidar sensor and/or the one or more imaging devices to determine which users are speaking and to assign the sound or sound files to a correct user.

18. A method of creating a view of an environment, comprising:
accessing computer-readable instructions from one or more memory devices for
execution by one or more processors of a computing device;
executing the computer-readable instructions accessed from the one or more memory devices by the one or more processors of the computing device; and
wherein executing the computer-readable instructions further comprising:
receiving, at the computing device, voice files, visual effect files, facial expression files and/or mobility files;
receiving parameters and measurements from at least two of one or more microphones, one or more imaging devices, a radar sensor, a lidar sensor and/or one or more infrared imaging devices located in the computing device;
analyzing the parameters and measurements received from the multimodal input; generating a world map of the environment around the computing device, the world map including two or more users and objects;
repeating the receiving of parameters and measurements from the input devices and the analyzing steps on a periodic basis to maintain a persistent world map of the environment;
tracking the engagement of the two or more users utilizing the received parameters and measurements to determine the one or more users that are engaged with the computing device;
identifying one or more users in the world map; and
analyzing mouth shape and/or lip movement of received images for the one or more users to improve speech recognition accuracy.

19. A method of creating a view of an environment, comprising:
accessing computer-readable instructions from one or more memory devices for
execution by one or more processors of a computing device;
executing the computer-readable instructions accessed from the one or more memory devices by the one or more processors of the computing device; and
wherein executing the computer-readable instructions further comprising:
receiving, at the computing device, voice files, visual effect files, facial expression files and/or mobility files;
receiving parameters and measurements from at least two of one or more microphones, one or more imaging devices, a radar sensor, a lidar sensor and/or one or more infrared imaging devices located in the computing device;
analyzing the parameters and measurements received from the multimodal input; generating a world map of the environment around the computing device, the world map including two or more users and objects;
repeating the receiving of parameters and measurements from the input devices and the analyzing steps on a periodic basis to maintain a persistent world map of the environment;
tracking the engagement of the two or more users utilizing the received parameters and measurements to determine the one or more users that are engaged with the computing device;
determining a noise level for the environment based on receipt of sounds and/or sound files from the two or more users; and
generating sound files to be reproduced by one or more speakers of the computing device requesting the user move to a quieter embodiment if the environment is too noisy to hear a user that is speaking.

* * * * *